US009497689B2

(12) United States Patent
Jiang et al.

(10) Patent No.: US 9,497,689 B2
(45) Date of Patent: Nov. 15, 2016

(54) METHOD AND APPARATUS FOR DETERMINING EPDCCH-BASED DOWNLINK CONTROL INFORMATION

(71) Applicant: Alcatel Lucent, Boulogne Billancourt (FR)

(72) Inventors: Qi Jiang, Shanghai (CN); Zheng Liu, Shanghai (CN); Matthew Baker, Canterbury (GB); Shin Horng Wong, Chippenham (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/431,616

(22) PCT Filed: Sep. 2, 2013

(86) PCT No.: PCT/IB2013/002096
§ 371 (c)(1),
(2) Date: Mar. 26, 2015

(87) PCT Pub. No.: WO2014/049417
PCT Pub. Date: Apr. 3, 2014

(65) Prior Publication Data
US 2015/0257086 A1    Sep. 10, 2015

(30) Foreign Application Priority Data
Sep. 28, 2012 (CN) .......................... 2012 1 0377808

(51) Int. Cl.
*H04W 48/12* (2009.01)
*H04W 72/04* (2009.01)
(Continued)

(52) U.S. Cl.
CPC ............. *H04W 48/12* (2013.01); *H04W 48/08* (2013.01); *H04W 72/042* (2013.01); *H04W 48/16* (2013.01)

(58) Field of Classification Search
CPC ........................... H04W 48/12; H04W 72/042

USPC ......................................................... 370/329
See application file for complete search history.

(56) References Cited

U.S. PATENT DOCUMENTS

| 9,167,575 | B2* | 10/2015 | Park ................... H04W 72/042 |
|---|---|---|---|
| 2011/0110251 | A1* | 5/2011 | Krishnamurthy ... H04W 72/082 370/252 |

(Continued)

FOREIGN PATENT DOCUMENTS

| CN | 102315870 A | 1/2012 |
|---|---|---|
| WO | WO 2012/109542 A1 | 8/2012 |

OTHER PUBLICATIONS

Huawei et al., "Search space design for ePDCCH," 3rd Generation Partnership Project (3GPP), 3GPP TSG RAN WG1 Meeting #70, R1-123120, pp. 1-6, XP050661014, Qingdao, China, Aug. 13-17, 2012.

(Continued)

*Primary Examiner* — Luat Phung
*Assistant Examiner* — Thomas R Cairns
(74) *Attorney, Agent, or Firm* — Fay Sharpe, LLP

(57) ABSTRACT

An object of the present invention is to provide a method and apparatus for determining ePDCCH-based downlink control information. Specifically, receiving a control signaling from an eNB, wherein the control signaling comprises at least one ePDCCH set and corresponding configuration information thereof; determining candidate resource index information based on the control signaling; performing DCI blind detection operation based on the candidate resource index information, so as to obtain downlink control information corresponding to the control signaling.

15 Claims, 7 Drawing Sheets

(51) Int. Cl.
*H04W 48/08* (2009.01)
*H04W 48/16* (2009.01)

(56) References Cited

U.S. PATENT DOCUMENTS

| | | | | |
|---|---|---|---|---|
| 2011/0274066 | A1* | 11/2011 | Tee | H04L 5/001 370/329 |
| 2013/0039284 | A1* | 2/2013 | Marinier | H04L 5/001 370/329 |
| 2013/0242885 | A1* | 9/2013 | Zhu | H04W 52/0235 370/329 |
| 2014/0036810 | A1* | 2/2014 | Harrison | H04W 72/042 370/329 |
| 2014/0105155 | A1* | 4/2014 | Kim | H04L 1/1861 370/329 |
| 2015/0146666 | A1* | 5/2015 | Wu | H04W 72/04 370/329 |
| 2015/0146672 | A1* | 5/2015 | Wu | H04W 72/04 370/329 |
| 2015/0181577 | A1* | 6/2015 | Moulsley | H04L 5/0053 370/329 |
| 2015/0257085 | A1* | 9/2015 | Zhang | H04W 72/04 370/254 |
| 2015/0282135 | A1* | 10/2015 | Jiang | H04L 5/0053 370/329 |
| 2015/0327223 | A1* | 11/2015 | Zhang | H04W 48/12 370/329 |

OTHER PUBLICATIONS

Panasonic, "ePDCCH search space design and configuration," 3$^{rd}$ Generation Partnership Project (3GPP), 3GPP TSG RAN WG1 Meeting #69, R1-122202, pp. 1-5, XP050600466, Prague, Czech Republic, May 21-25, 2012.

Motorola Mobility, "Configuration of EPDCCH," 3$^{rd}$ Generation Partnership Project (3GPP), 3GPP TSG RAN WG1 #70, R1-123788, pp. 1-6, XP050661641, QingDau, P.R. China, Aug. 13-18, 2012.

Nokia et al., "Considerations on search spaces," 3$^{rd}$ Generation Partnership Project (3GPP), 3GPP TSG RAN WG1 Meeting #70, R1-123653, pp. 1-7, XP050661693, Qingdao, China, Aug. 13-17, 2012.

International Search Report for PCT/IB2013/002096 dated Mar. 28, 2014.

* cited by examiner

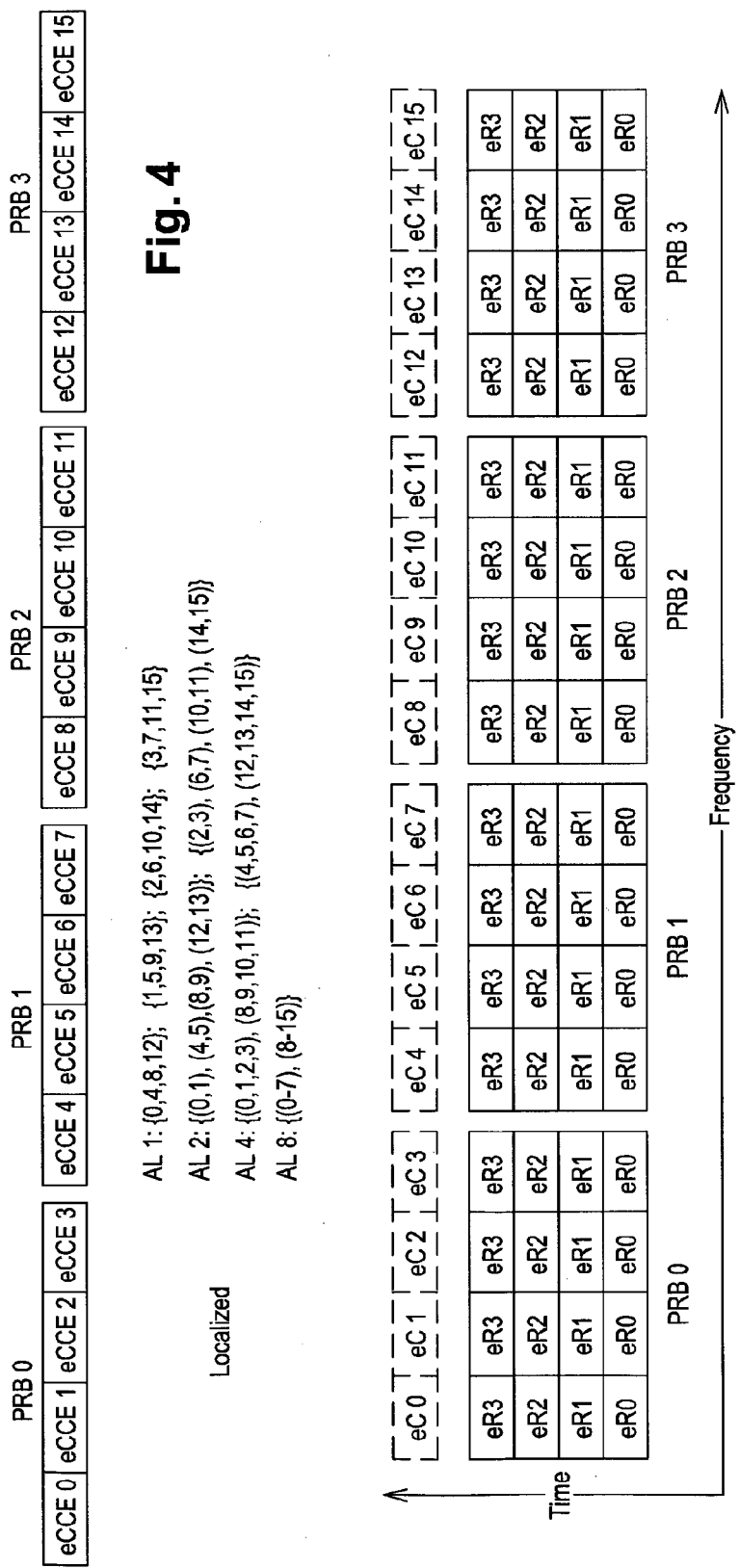

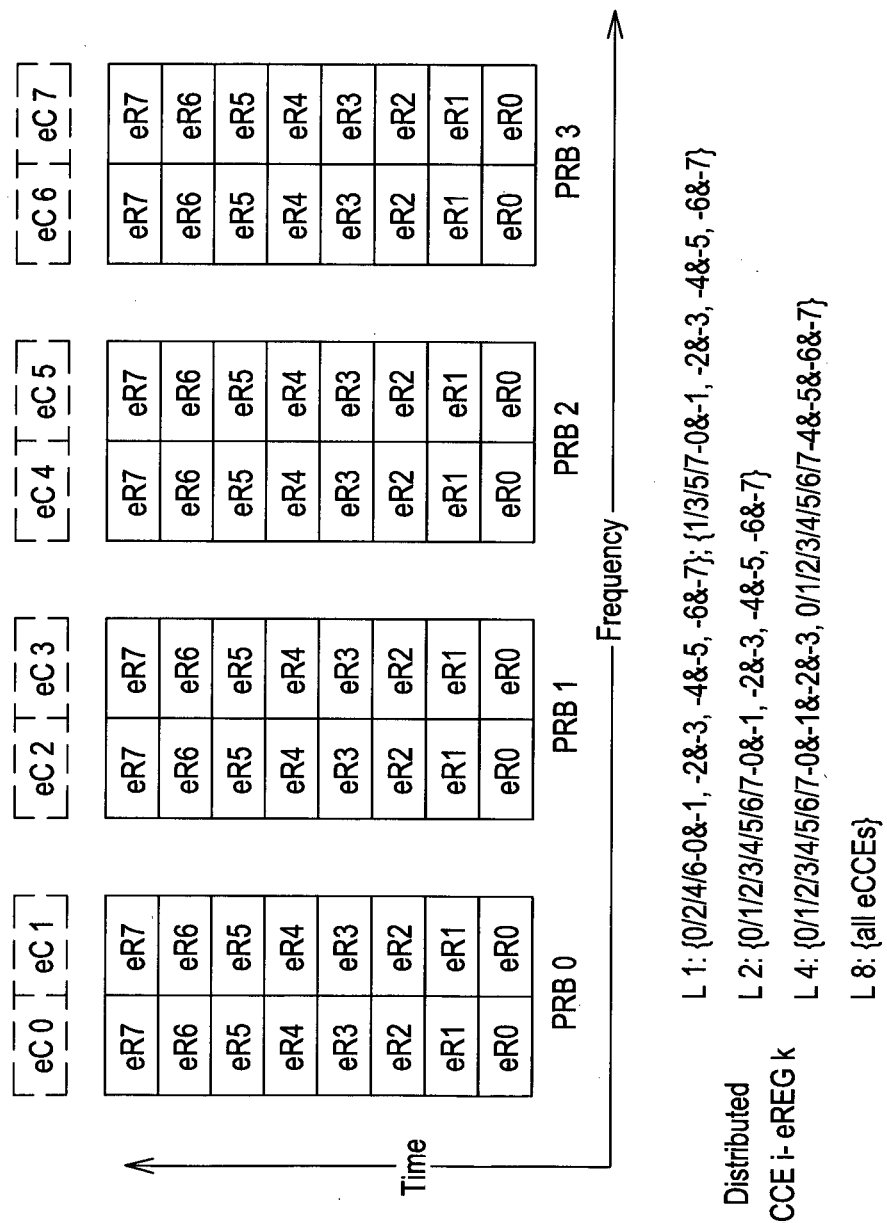

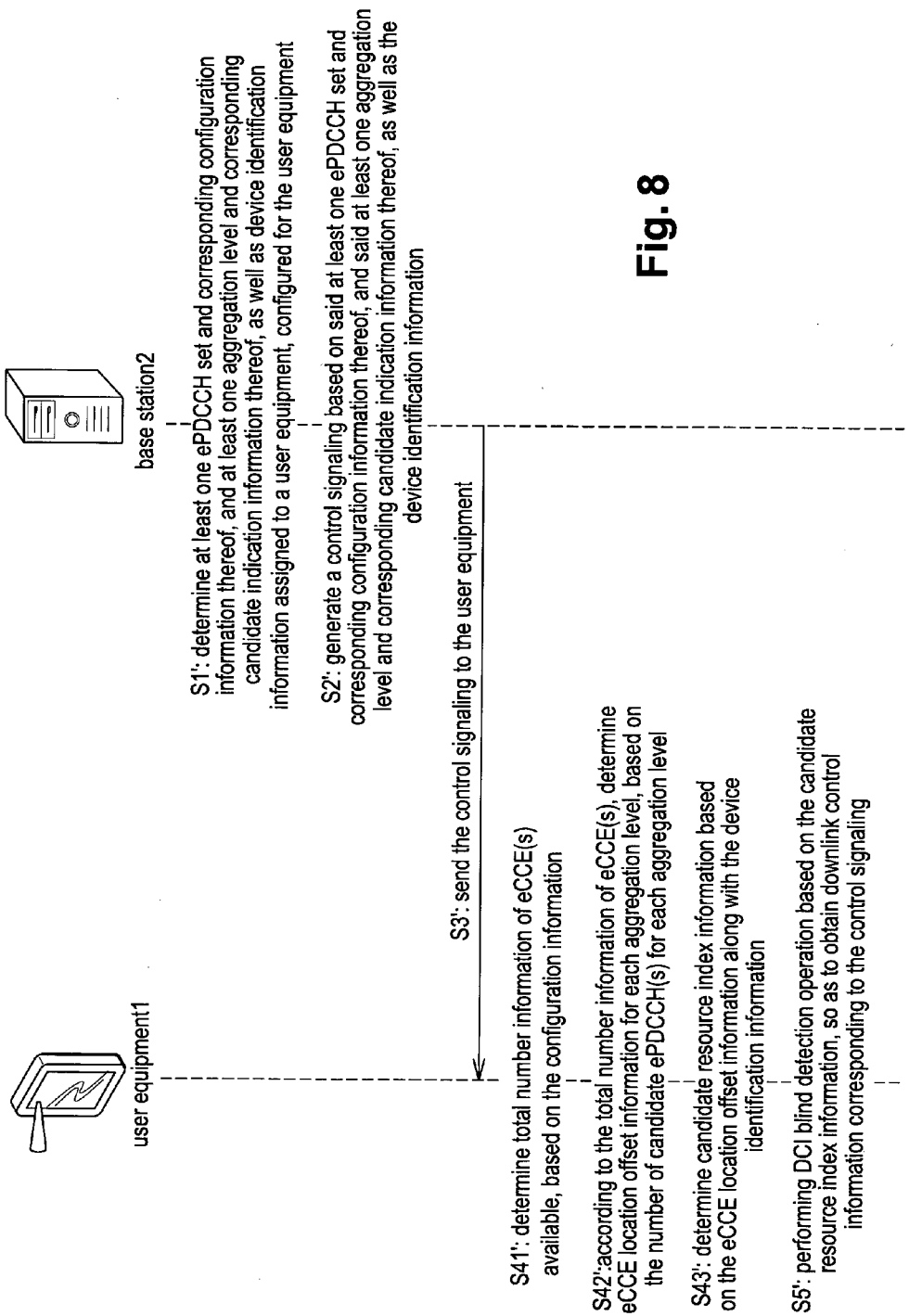

METHOD AND APPARATUS FOR DETERMINING EPDCCH-BASED DOWNLINK CONTROL INFORMATION

FIELD OF THE INVENTION

The present invention relates to the field of communication technology, and more particularly to a technology for determining ePDCCH-based downlink control information.

BACKGROUND OF THE INVENTION

In 3GPP R11, the design of an enhanced physical downlink control channel (ePDCCH) is based on considerations from Enhanced Inter Cell Interference Coordination (eICIC), and enhancement new carrier types such as CoMP and DL MIMO in the current protocol. In 3GPP RAN#70 Meeting, the ePDCCH set has been publicly known as a key feature in ePDCCH design, for example:

I. An ePDCCH set is defined as a group of N PRB pairs:
   A distributed ePDCCH is transmitted using the N PRB pairs in an ePDCCH set;
   A localized ePDCCH should be transmitted within an ePDCCH set;

II. A base station configures K≥1 ePDCCH sets for the UE:
   Maximum number for K is selected among 2, 3, 4 and 6;
   The total number of blind decoding attempts is independent from K;
   The total blind decoding attempts for a UE should be split into configured K ePDCCH sets;
   Each ePDCCH set is configured for either localized ePDCCH or distributed ePDCCH;
   PRB pairs of ePDCCH sets with different logical ePDCCH set indices can be fully overlapped, partially overlapped, or non-overlapping.

According to the above currently agreed definition of an ePDCCH set, a UE (User Equipment) configured with ePDCCH will monitor a group of PRB pairs with several ePDCCH sets for USS (UE-Specific Search Space) detection. Part of the ePDCCH sets are for localized transmissions, while the remainings are for distributed transmissions. The ePDCCH sets for distributed or localized transmissions may be partially overlapped, fully overlapped, or non-overlapped.

The current protocol provides a flexible configuration of PRBs for UE to monitor ePDCCH USS. According to this protocol, the legacy hash function (depiction of the hash function is provided in section 9.1.1 in 3GPP TS 36.213) method, for example equation (1) and equation (2), for ePDCCH searching space cannot be used here without any modification.

$$L\{(Y_k+m) \bmod \lfloor N_{CCE,k}/L \rfloor\}+i \quad (1)$$

$$Y_k=(A \cdot Y_{k-1}) \bmod D \quad (2)$$

Wherein L denotes an aggregation level, m is the candidate number for each aggregation level L, $N_{CCE,k}$ is the total CCE number in the control region of the subframe K, $Y_k$ is defined as i=0, ..., L-1, m=0, ..., $M^{(L)}$-1, and $M^{(L)}$ denotes a candidate number of PDCCHs which need to be monitored for a given searching space.

SUMMARY OF THE INVENTION

An object of the invention is to provide a method and apparatus for determining ePDCCH-based downlink control information.

According to one aspect of this invention, there is provided a method for determining ePDCCH-based downlink control information at a user equipment, wherein said method comprising the following steps:
  a. receiving a control signaling from an eNB, wherein the control signaling comprises at least one ePDCCH set and corresponding configuration information thereof;
  b. determining candidate resource index information based on the control signaling;
  c. performing DCI blind detection operation based on the candidate resource index information, so as to obtain downlink control information corresponding to the control signaling.

In accordance with another aspect of this invention, there is provided a method for a method for auxiliary determining ePDCCH-based downlink control information at an eNB, wherein the method comprising the following steps:
  A. determining at least one ePDCCH set and corresponding configuration information thereof, configured for a user equipment;
  B. generating a control signaling based on said at least one ePDCCH set and corresponding configuration information thereof;
  C. sending the control signaling to the user equipment, wherein the control signaling includes said at least one ePDCCH set and corresponding configuration information thereof.

In accordance with one aspect of this invention, there is provided a user equipment for determining ePDCCH-based downlink control information, wherein the user equipment comprising:
  an information receiving apparatus configured to receive a control signaling from an eNB, wherein the control signaling comprises at least one ePDCCH set and corresponding configuration information thereof;
  an index determining apparatus configured to determine candidate resource index information based on the control signaling;
  a blind detection executing apparatus configured to perform DCI blind detection operation based on the candidate resource index information, so as to obtain downlink control information corresponding to the control signaling.

In accordance with another aspect of this invention, there is provided an eNB base station for auxiliary determining ePDCCH-based downlink control information, wherein the base station comprising:
  a configuration determining apparatus configured to determine at least one ePDCCH set and corresponding configuration information thereof, configured for a user equipment;
  a signaling generating apparatus configured to generate a control signaling based on said at least one ePDCCH set and corresponding configuration information thereof;
  a signaling sending apparatus configured to send the control signaling to the user equipment, wherein the control signaling includes said at least one ePDCCH set and corresponding configuration information thereof.

According to a further aspect of this invention, there is further provided a communication system, wherein the communication system comprises the aforementioned a user equipment for determining ePDCCH-based downlink control information according to one aspect of the invention, and the aforementioned an eNB base station for auxiliary determining ePDCCH-based downlink control information according to another aspect of the invention.

Compared with the prior art, based on the control signaling received from the eNB, wherein the control signaling comprises at least one ePDCCH set and corresponding configuration information thereof, the user equipment of the invention determines candidate resource index information, and then performs DCI blind detection operation based on the candidate resource index information, so as to obtain downlink control information corresponding to the control signaling, therefore, the invention realizes determination of ePDCCH-based downlink control information. Further, in the present invention, the user equipment may further according to the control signaling received from the eNB, determines candidate resource index information based on a predetermined hash function, thereby achieving the predetermined hash function, wherein the hash function includes parameter information of total number of eCCE(s) and/or eREG(s), available and necessary for monitoring, by modifying the existing hash function, so as to realizes determination of the ePDCCH-based downlink control information, therefore, this extends application of the existing hash function in the ePDCCH. Besides, the user equipment in the present invention may further determine the candidate resource index information based on the control signaling received from an eNB, wherein the control signaling comprises at least one ePDCCH set and corresponding configuration information thereof, at least one aggregation level and corresponding candidate indication information thereof, and device identification information, thereby realizing a new determining method for determining ePDCCH-based downlink control information.

BRIEF DESCRIPTION OF THE DRAWINGS

Other features, aims and advantages of this invention will become more apparent through reading the detailed statement of the non-restrictive embodiments made with reference to the following accompanying drawings:

FIG. 4 shows an index diagram of 4 PRBs with 16 eCCEs in one UE group in localized mode for determining ePDCCH-based downlink control information according to a preferable embodiment of the invention;

FIG. 5 shows an index diagram of 4 PRBs pairs (16 eCCEs) at different aggregation levels in distributed mode for determining ePDCCH-based downlink control information according to one preferred embodiment of the invention;

FIG. 6 shows an index diagram of 4 PRB pairs (8 eCCEs) in distributed mode for determining ePDCCH-based downlink control information according to a preferable embodiment of the invention;

FIG. 8 is a flow chart illustrating a method for determining ePDCCH-based downlink control information accomplished by a user equipment in collaboration with a base station according to a preferable embodiment of the invention.

DETAILED DESCRIPTION OF THE PREFERRED EMBODIMENTS

Below, details of the invention will be further provided in combination with the accompanying drawings.

Figure 1:
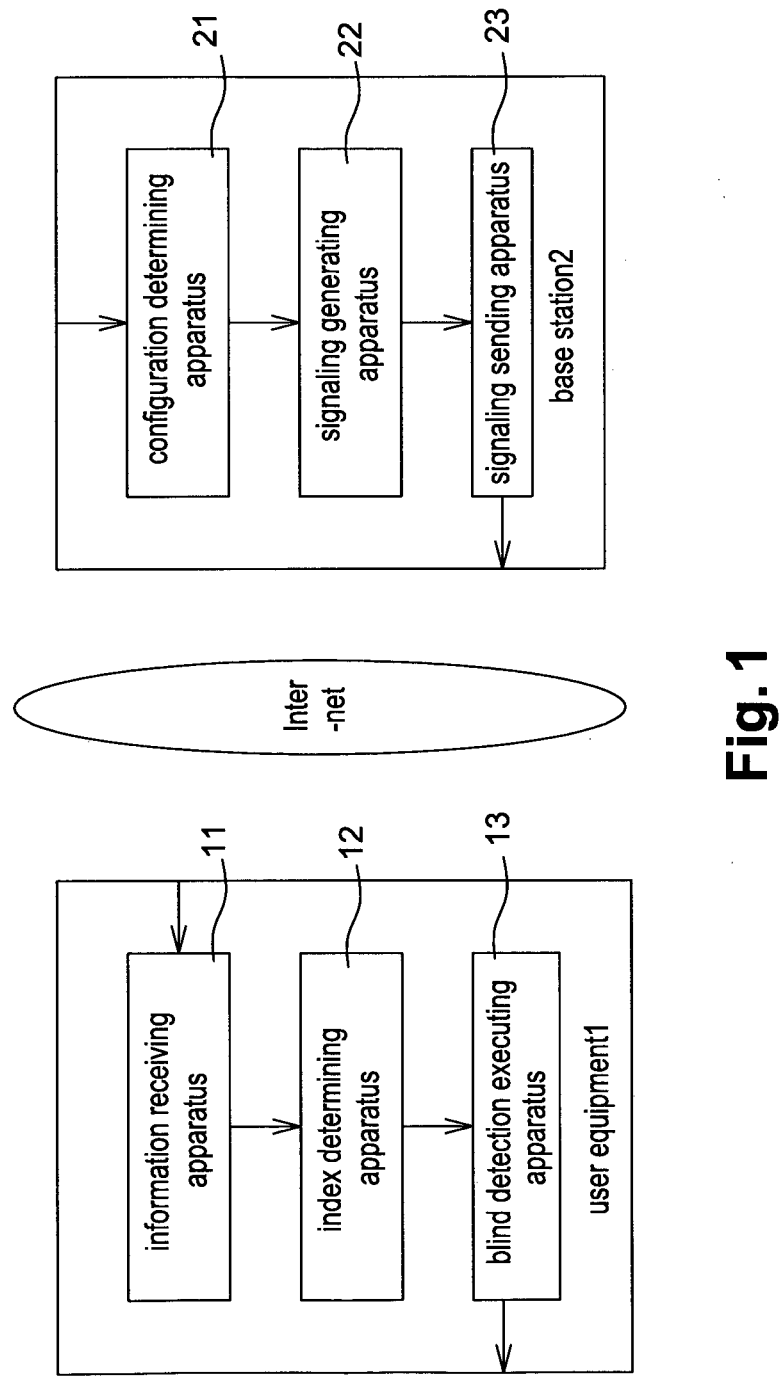
FIG. 1 shows a schematic diagram of a user equipment and a base station for determining ePDCCH-based downlink control information according to one aspect of the invention.

FIG. 1 shows a schematic diagram of a user equipment 1 and a base station 2 for determining ePDCCH-based downlink control information according to one aspect of the present invention, wherein the user equipment 1 comprises an information receiving apparatus 11, an index determining apparatus 12, and a blind detection execution apparatus 13, the base station 2 comprises a configuration determining apparatus 21, a signaling generation apparatus 22, and a signaling sending apparatus 23. Specifically, the configuration determining apparatus 21 in the base station 2 determines at least one ePDCCH set and corresponding configuration information thereof, configured for a user equipment; the signaling generating apparatus 22 generates a control signaling based on said at least one ePDCCH set and corresponding configuration information thereof; the signaling sending apparatus 23 sends the control signaling to the user equipment, wherein the control signaling includes said at least one ePDCCH set and corresponding configuration information thereof, correspondingly, the information receiving apparatus 11 in the user equipment 1 receives a control signaling from an eNB, wherein the control signaling comprises at least one ePDCCH set and corresponding configuration information thereof; the index determining apparatus 12 determines candidate resource index information based on the control signaling; the blind detection execution apparatus 13 performs DCI blind detection operation based on the candidate resource index information, so as to obtain the downlink control information corresponding to the control signaling.

Here, the user equipment refers to the part in mobile communication device, which terminates wireless transmission from or to the network and adapts the capability of a terminal device to the wireless transmission, i.e., the device for a user to access to the mobile network, which includes, but not limited to, any electronic product that performs human-machine interaction with the user through a keyboard, a touch pad, or a voice-control device, and implements transmission of mobile communication signals through mutual transmission and reception of signals between a mobile network and a base station, for example, a tablet, a smart mobile phone, a PDA, a vehicle mount computer, etc. Here, the base station refers to a device in mobile communication system, which connects a fixed part and a wireless part and is connected to a mobile station through air wireless transmission, for example, eNB (evolved Node B). Here, the mobile network includes, but not limited to, GSM, 3G, TD-LTE, Wi-Fi, WiMax, WCDMA, CDMA2000, TD-SCDMA, HSPA, LTS, etc. Those skilled in the art should understand that the aforesaid user equipment, base station, and mobile networks are only examples, other existing user equipments, base stations, and mobile networks or those that may possibly come out later should also be covered in the protection scope of the invention and included here in a way of quotation, if they are adaptable to this invention.

Specifically, the configuration determining apparatus 21 in the base station 2 may determine at least one ePDCCH set and corresponding configuration information thereof, configured for user equipment 1, based on the current schedulable resource information, interference information from one or more cells adjacent to the base station, and downlink channel relevant information of the user equipment (for example, channel quality and other information affecting the channel quality such as network condition, etc.), and the like. Here, the configuration information includes number information N of the PRB pairs and locations thereof, occupied by a ePDCCH set. For example, suppose a base station eNB determines that the downlink channel quality of UE1 is good based on the CQI (channel quality indication) reported by UE1, then the configuration determining apparatus 21 configures one ePDCCH set, e.g. ePDCCH set 1, and corresponding configuration information thereof, for UE1, such as ePDCCH set 1 comprises 2 PRBs and the location information location 1 corresponding to the 2 PRBs; if the base station eNB determines that the downlink channel quality of UE2 is bad based on the CQI (channel quality indication) reported by UE2, then the configuration determining apparatus 21 configures two ePDCCH sets, e.g. ePDCCH set 2 and ePDCCH set 3, and their respective corresponding configuration information, for UE2, for example, ePDCCH set 2 includes 2 PRBs, ePDCCH set 3 includes 2 PRBs, and the location information location 2 corresponding to the 2 PRBs included in ePDCCH set 2, and location information location 3 corresponding to the 2 PRBs included in the ePDCCH set 3.

Those skilled in the art should understand that the aforesaid manner of determining the at least one ePDCCH set configured for the user equipment and corresponding configuration information thereof is only an exemple, other existing manner of determining at least one ePDCCH set configured for the user equipment and corresponding configuration information thereof or those that may possibly come out later should also be covered in the protection scope of the invention and included here in a way of quotation, if they are adaptable to this invention.

The signaling generating apparatus 22 generates a control signaling based on the at least one ePDCCH set and corresponding configuration information thereof. Here, the control signaling is for indicating a user equipment to perform reception of the ePDCCH, which may include, but not limited to, for example, RRC (Radio Resource Control). For example, suppose the configuration determining apparatus 21 determines to configure one ePDCCH set, for example, ePDCCH set 1, and corresponding configuration information thereof, for UE1, such as ePDCCH set 1 comprises 2 PRBs and the location information location 1 corresponding to the 2 PRBs, then the signaling generation apparatus 22 generates the control signaling for example RRC1 based on the ePDCCH set 1 and corresponding configuration information thereof, for example, the ePDCCH set 1 comprises 2 PRBs, and the location information location 1 corresponding to the 2 PRBs.

Those skilled in the art should understand that the aforesaid manner of generating a control signaling is only an example, and other existing manner of generating a control signaling or those that may possibly come out later should also be covered in the protection scope of the invention and included here in a way of quotation, if they are adaptable to this invention.

The signaling sending apparatus 23 sends the control signaling to the user equipment via a mobile network, for example, TD-LTE (Time Division Long Term Evolution), wherein the control signaling comprises the at least one ePDCCH set and corresponding configuration information thereof.

Correspondingly, the information receiving apparatus 11 of the user equipment 1 receives the control signaling from the eNB via a mobile network, for example a TD-LTE, wherein the control signaling comprises at least one ePDCCH set and corresponding configuration information thereof.

The index determining apparatus 12 determines candidate resource index information based on the control signaling, via for example, a predetermined hash function. Here, the candidate resource index is used to perform decoding, RNYI descrambling, CRC check, etc., based on eCCE (enhanced-Control Channel Element) and/or eREG (enhanced-Resource Element Groups) of corresponding location, so as to obtain the DCI (Downlink Control Information) sent by the eNB, which includes, but not limited to, for example: 1) the index of eCCE or/and the index of eREG; 2) initial location of the eCCG and initial location of eREG. Here, the aforesaid traditional Hash function may be modified according to equations (1) and (2) to obtain a hash function suitable for ePHDCCH, for example, an equation. It may be seen from equations (1) and (2) that the UE-specific searching space results in a group of neighboring candidates (in terms of CCEs) are evenly allocated in all available CCEs.

Based on equations (1) and (2), for localized ePDCCH searching space, the above average allocation manner can be shared based on the concepts of the ePDCCH and UE group. Here, a new parameter $N_{eCCE,k}^n$ is defined, which indicates the total number of eCCEs available in the UE need to be monitor. Thus, for the localized ePDCCH, equations (1) and (2) can be modified to equations (3) and (4), thereby obtaining a new hash function:

$$L\{(Y_k+m) \bmod \lfloor N_{eCCE,k}^n/L \rfloor\}+i \qquad (3)$$

$$Y_k=(A \cdot Y_{k-1}) \bmod D \qquad (4)$$

For distributed ePDCCH, considering the diversity gain, equations (3) and (4) may be designed in eREG level. According to the current protocol, no matter how many eCCEs in one PRB, the number of eREGs is fixed to 16. This makes the unified design for searching space more easily. Thus, equations (3) and (4) can be modified to equations (5) and (6):

$$\{(Y_k+m) \bmod \lfloor N_{eREG,k}^n/L_{eREG} \rfloor + D_{m,L,k}\} + i_{eREG,L} \cdot \lfloor N_{eREG,k}^n/L_{eREG} \rfloor \qquad (5)$$

$$Y_k=(A \cdot Y_{k-1}) \bmod D \qquad (6)$$

Wherein, $D_{m,L,k}=m \cdot \lfloor \lfloor N_{eCCE,k}^n/L_{eREG} \rfloor/M(L) \rfloor$, $N_{eREG,k}^n$ is the total configured eREG number of a specific UE, while $L_{eREG}$ is the eREG number for each aggregation level L, $i_{eREG,L}=0, 1, \ldots, L_{eREG}-1$ is the corresponding value for each aggregation level L depending on the eCCE definition, M(L) is the candidate number for each aggregation level L, $D_{m,L,k}$ is the offset value to allocate call candidate evenly into all available eREGs. Based on equations (5) and (6), the candidate number for each aggregation level L is restricted by the total available eREG numbers, namely, $$M(L) \leq \lfloor N_{eCCE,k}^n/L_{eREG} \rfloor \qquad (7)$$

Figure 2:
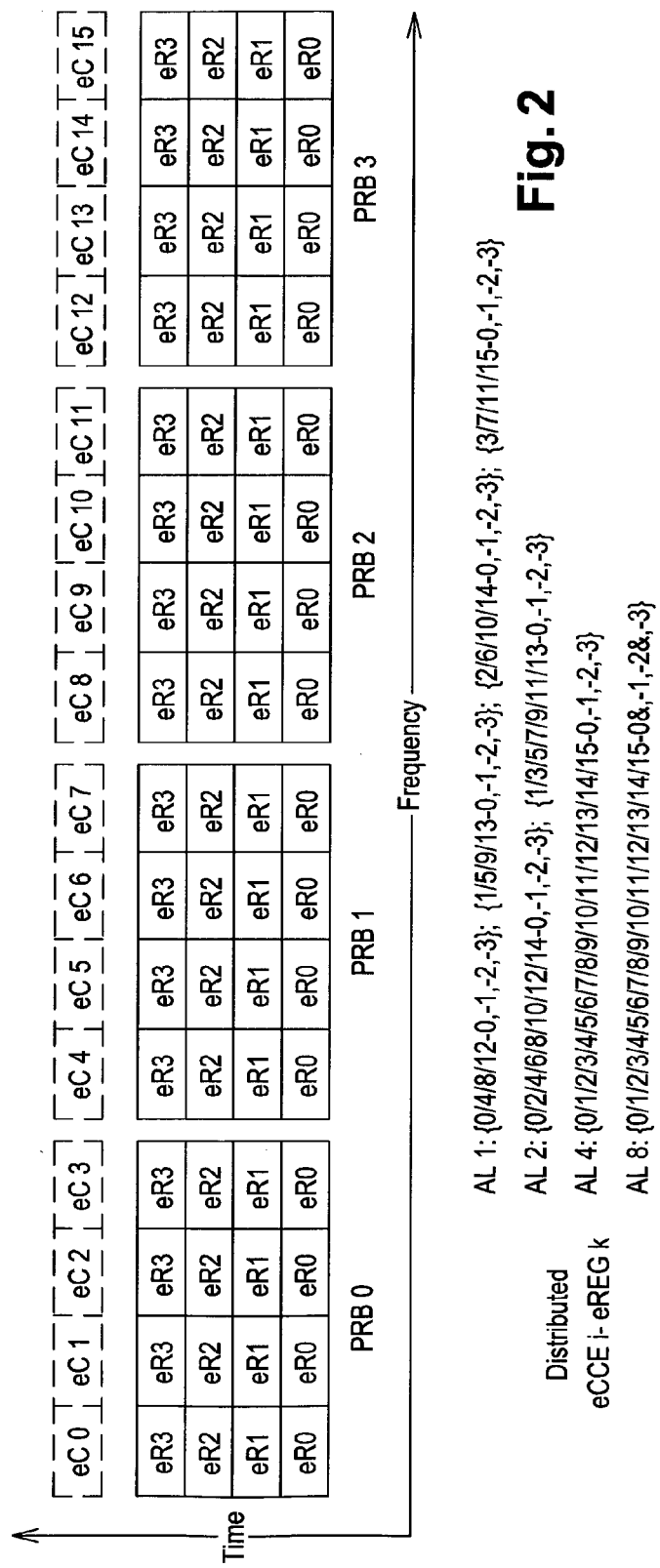
FIG. 2 shows a schematic diagram of the sequence order of 4 PRBs with 4 eCCEs per PRB for determining ePDCCH-based downlink control information according to one aspect of the invention.

Based on the above hash function, it should be noted that the eCCE and eREG sequences should be the same order for all PRBs, and a global eCCE index or eREG indexed for all eCCEs/eREGs configured to an UE for monitoring should be designed, for example, FIG. 2 shows the sequence order of 4 PRBs with 4 eCCEs per PRB.

Here, in order to make design of the searching space easier and more effective, the above hash function method is based on some working assumptions. According to the current protocol, there is no discussion about the resource allocation relationships for ePDCCH sets from different UEs, which means that there is no restriction about resource allocation for the ePDCCH sets from different UEs. However, considering the blocking possibility and effective searching space design, it is not preferred to have partially overlap resource allocations from different UE groups. Another explanation is that the eNB should not configure the ePDCCH for all ePDCCH configured UEs based on the following working assumptions:

Working assumption 1: Separate the configured UEs into several UE groups;

Working assumption 2: For the UEs in one UE group, they share the same PRB pairs to be monitored;

Working assumption 3: For the UEs in different UE groups, the PRBs allocated to be monitored should be in orthogonal way.

Here, it should be emphasized that because the ePDCCH is totally configured by the eNB, if the configuration of the eNB can effectively avoid the blocking problem among all scheduled UEs, and then the above working assumptions might be not needed. Thus, for one UE, it might only have one ePDCCH set for localized candidates, while another ePDCCH set for distributed candidates. These two sets may be partially overlapped. In this case, those skilled in the art should understand that the above hash function method may also be applied, just restrict the available eCCE or eREG numbers in one ePDCCH set in UE-specific manner, instead of groups UEs.

Those skilled in the art should understand that the above manner of modifying the existing hash function is only an example, and other existing manner of modifying the existing hash function or those that may possibly come out later should also be covered in the protection scope of the invention and included here in a way of quotation, if they are adaptable to this invention.

Those skilled in the art should understand that the above manner of determining candidate resource index information is only an example, and other currently existing manner of determining candidate resource index information or those that may possibly come out later should also be covered in the protection scope of the invention and included here in a way of quotation, if they are adaptable to this invention.

Preferably, the index determining apparatus 12 may also, according to the control signaling, determine candidate resource index information based on a predetermined hash function, wherein the hash function includes parameter information of total number of eCCE(s) and/or eREG(s), available and necessary for monitoring.

For example, the index determining apparatus 12, according to the control signaling received from the information receiving apparatus 11, determines the candidate resource index information based on the corresponding hash function applied to the localized ePDCCH corresponding to the above equations (3) and (4), or based on the hash function applied to the distributed ePDCCH corresponding to the above equations (5) and (6), wherein the hash function corresponding to the equations (3) and (4) include parameter information of total number of eCCE(s), available and necessary for monitoring, such as $N_{eCCE,k}^{n}$, and the hash function corresponding to the equations (5) and (6) includes parameter information of total number of eREG(s), available and necessary for monitoring, for example, $N_{eEGE,k}^{n}$.

Those skilled in the art should understand that the above manner of determining candidate resource index information based on the predetermined hash function is only an example, and other existing manner of determining candidate resource index information based on the predetermined hash function or those that may possibly come out later should also be covered in the protection scope of the invention and included here in a way of quotation, if they are adaptable to this invention.

The blind detection executing apparatus 13 performs the DCI blind detection operation based on the candidate resource index information so as to obtain downlink control information corresponding to the control signaling. For example, the blind detection executing apparatus 13 executes the DCI blind detection operation based on the candidate resource index information determined by the index determining apparatus 12, for example, performing decoding, RNTI descrambling, CRC check, etc., based on the eCCE and/or eREG at the initial location corresponding to the candidate resource index information, to determine whether the CRC is correct; if the CRC is determined to be correct, the check will not be performed any more, and then the DCI format is determined based on its length, i.e., obtaining the DCI sent by the eNB; if the CRC is determined to be incorrect, then a second eCCE and/or eREG is searched, and after completion of searching at one aggregation level, the search at the next aggregation level is performed, till obtaining the information required by the UE.

Those skilled in the art should understand that the above manner of executing DCI blind detection operation is only an example, and other currently existing manner of executing DCI blind detection operation those that may possibly come out later should also be covered in the protection scope of the invention and included here in a way of quotation, if they are adaptable to this invention.

The various apparatus of User equipment 1 and base station 2 works continuously between each other. Specifically, the configuration determining apparatus 21 of the base station 2 continuously determines at least one ePDCCH set and corresponding configuration information thereof configured for user equipment 1; the signaling generating apparatus 22 continuously generates a control signaling based on the at least one ePDCCH set and corresponding configuration information thereof; the signaling sending apparatus 23 continuously sends the control signaling to the user equipment, wherein the control signaling includes at least one ePDCCH set and corresponding configuration information thereof; the index determining apparatus 12 continuously determines candidate resource index information based on the control signaling; the blind detection executing apparatus 13 continuously executes the DCI blind detection operation based on the candidate resource index information so as to obtain the downlink control information corresponding to the control signaling. Here, those skilled in the art should understand that "continuously" means the various apparatus of user equipment 1 and base station 2 continuously determine the ePDCCH set and corresponding configuration information thereof, generate a control signaling, send and receive the control signaling, determine the candidate resource index information, and perform DCI blind detection operation, till the base station 2 stops determining the ePDCCH set and corresponding configuration information thereof within a relatively long time.

In one preferred embodiment (see FIG. 1), user equipment 1 comprises an information receiving apparatus 11, an index determining apparatus 12, and a blind detection performing apparatus 13; the base station 2 comprises a configuration determining apparatus 21, a signaling generating apparatus 22, and a signaling sending apparatus 23. Specifically, the configuration determining apparatus 21 of the base station 2 determines at least one ePDCCH set and corresponding configuration information thereof, and at least one aggregation level and corresponding candidate indication information thereof, configured for the user equipment, wherein the candidate indication information is used to determine the number of candidate ePDCCH(s) for each aggregation level; the signaling generating apparatus 22 generates a control signaling based on the at least one ePDCCH set and corresponding configuration information thereof, and the at least one aggregation level and corresponding candidate indication information thereof; the signaling sending apparatus 23 sends the control signaling to the user equipment, wherein the control signaling comprises at least one ePDCCH set and corresponding configuration information thereof, and at least one aggregation level and corresponding candidate indication information thereof; correspondingly, the information receiving apparatus 11 of the user equipment 1 receives the control signaling from the base station 2, wherein the control signaling comprises at least one ePDCCH set and corresponding configuration information thereof, and at least one aggregation level and corresponding candidate indication information thereof, wherein the candidate indication information is used to determine the number of candidate ePDCCH(s) for each aggregation level; the index determining apparatus 12, according to the control signaling, determines candidate resource index information based on a predetermined hash function, wherein the hash function includes parameter information about total number of eCCE(s) and/or eREG(s), necessary for monitoring and available, wherein the candidate resource index information includes eCCE index information and/or eREG index information corresponding to said at least one aggregation level; the blind detection executing apparatus 13 performs DCI blind detection operation based on the candidate resource index information so as to obtain downlink control information corresponding to the control signaling. Here, the blind detection executing apparatus 13 is same as or basically identical with the apparatus in the corresponding embodiment of FIG. 1, in order for simplicity, details are no longer described and only included here in a way of quotation.

Specifically, the configuration determining apparatus 21 of the base station 2 determines at least one ePDCCH set configured for user equipment 1 and corresponding configuration information thereof, and at least one aggregation level and corresponding candidate indication information thereof, wherein the candidate indication information is for determining the number of candidate ePDCCHs corresponding to respective aggregation levels. Here, the aggregation level and corresponding candidate indication information thereof are both configurable and sent by base station 2; if the base station 2 does not send the aggregation level and corresponding candidate indication information thereof, it follows the prior art, i.e., following the rules corresponding to the existing hash function equations (1) and (2), and the aggregation level and corresponding candidate indication information thereof are fixedly set.

Here, the manner of determining at least one ePDCCH set configured for user equipment 1 and corresponding configuration information thereof, and at least one aggregation level and corresponding candidate indication information thereof as performed by the configuration determining apparatus 21 is identical or basically identical with the manner of determining the at least one ePDCCH set configured for the user equipment and corresponding configuration information thereof as performed by the configuration determining apparatus 21 in FIG. 1, in order for simplicity, details are no longer described and only included here in a way of quotation.

The signaling generating apparatus 22 generates a control signaling based on the at least one ePDCCH set and corresponding configuration information thereof, and the at least one aggregation level and corresponding candidate indication information thereof. Here, the manner of generating a control signaling based on the at least one ePDCCH set and corresponding configuration information thereof, and the at least one aggregation level and corresponding candidate indication information thereof as performed by the signaling generating apparatus 22 is identical or basically identical with the manner of generating a control signaling based on the at least one ePDCCH set and corresponding configuration information thereof as performed by the signaling generating apparatus 22 in FIG. 1, in order for simplicity, details are no longer described and only included here in a way of quotation.

The signaling sending apparatus 23 sends the control signaling to the user equipment through a mobile network for example, a TD-LTE, wherein the control signaling comprises the at least ePDCCH set and corresponding configuration information thereof, and at least one aggregation level and corresponding candidate indication information thereof.

Correspondingly, the information receiving apparatus 11 of the user equipment 1 receives a control signaling from the base station 2 through a mobile network for example TD-LTE, wherein the control signaling comprises at least one ePDCCH set and corresponding configuration information thereof, and at least one aggregation level and corresponding candidate indication information thereof, wherein the candidate indication information is used to determine the number of candidate ePDCCH(s) for each aggregation level.

The index determining apparatus 12, according to the control signaling, determines candidate resource index information based on a predetermined hash function, wherein the hash function includes parameter information about total number of eCCE(s) and/or eREG(s), necessary for monitoring and available, wherein the candidate resource index information includes eCCE index information and/or eREG index information corresponding to said at least one aggregation level.

For example, suppose the information receiving apparatus 11 receives a control signaling from a base station 2, wherein the control signaling comprises at least one ePDCCH set, e.g. ePDCCH set 1, and corresponding configuration information thereof, for example, ePDCCH set 1 comprises 2 PRBs, and at least one aggregation level, for example, two aggregation levels such as L1=1 and L2=2, and corresponding candidate indication information thereof, for example, the candidate indication information corresponding to aggregation L1=1 is that the number of candidate ePDCCHs is 6, the candidate indication information corresponding to L1=2 is that the number of candidate ePDCCHs is 6, then the index determining apparatus 12 determines the candidate resource index information based on the predetermined hash function according to the control signaling, for example, based on the hash function applied to localized ePDCCH corresponding to the equations (3) and (4), or the hash function applied to the distributed ePDCCH corresponding to the above equations (5) and (6), wherein the hash function corresponding to equations (3) and (4) includes parameter information about total number of eCCE(s), necessary for monitoring and available, such as $N_{eCCE,k}''$; the hash function corresponding to the above equations (5) and (6)

includes parameter information about total number of eREG(s), necessary for monitoring and available, such as $N_{eEGE,k}^{''}$.

Figure 3:
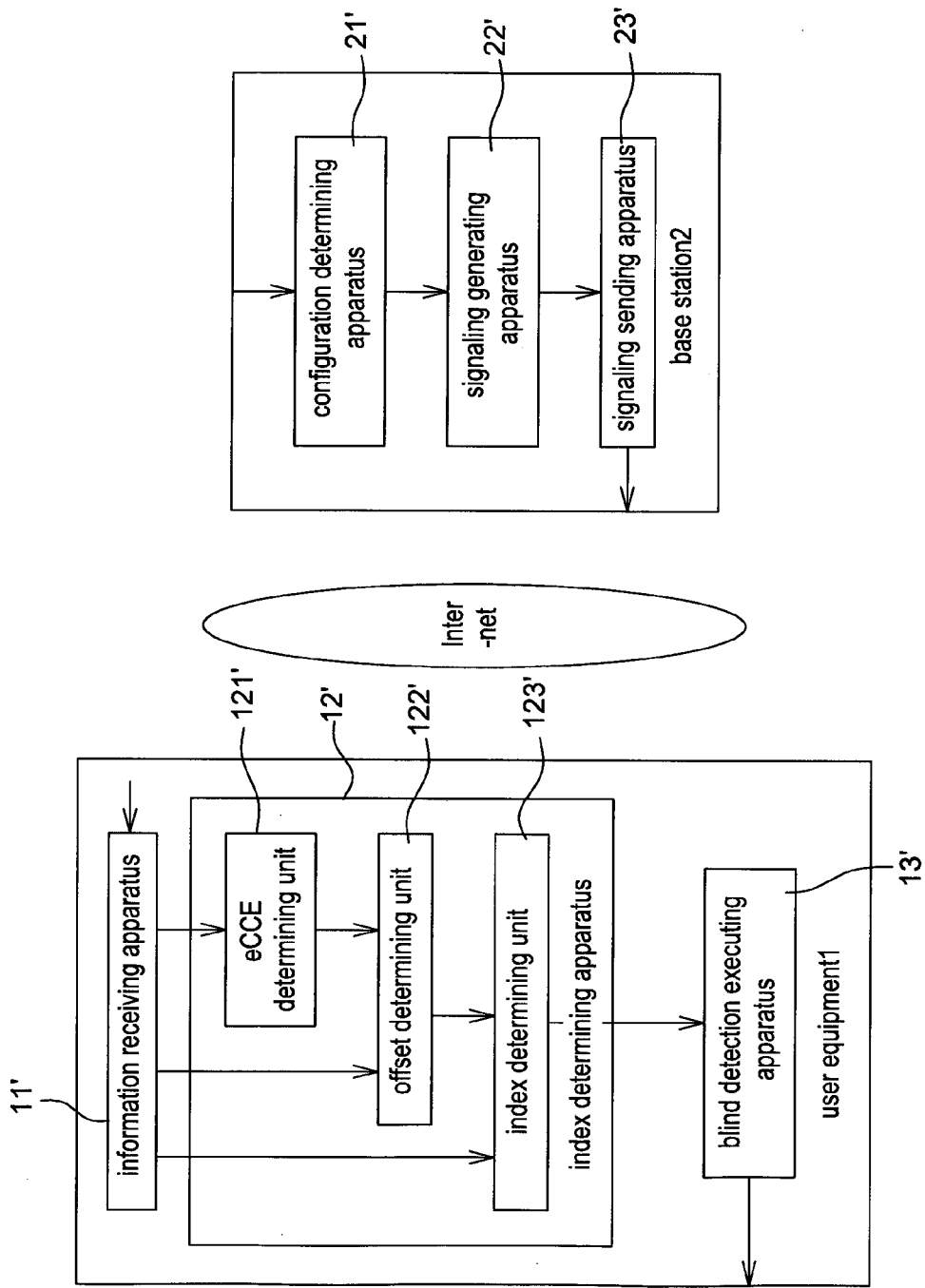
FIG. 3 shows a schematic diagram of a user equipment and a base station for determining ePDCCH-based downlink control information according to a preferable embodiment of the invention.

FIG. 3 shows a schematic diagram of a user equipment 1 and a base station 2 for determining ePDCCH-based downlink control information according to a preferable embodiment of the invention, wherein the user equipment 1 comprises an information receiving apparatus 11', an index determining apparatus 12', and a blind detection executing apparatus 13'; the base station 2 comprises a configuration determining apparatus 21', a signaling generating apparatus 22' and a signaling sending apparatus 23', wherein the index determining apparatus 12' comprises an eCCE determining unit 121', an offset determining unit 122', and an index determining unit 123'. Specifically, the configuration determining apparatus 21' of the base station 2 determines at least one ePDCCH set and corresponding configuration information thereof, and at least one aggregation level and corresponding candidate indication information thereof, as well as device identification information assigned to the user equipment 1, configured for the user equipment 1, wherein the candidate indication information is used to determine the number of candidate ePDCCH(s) for each aggregation level; the signaling generation apparatus 22' generates a control signaling based on said at least one ePDCCH set and corresponding configuration information thereof, and said at least one aggregation level and corresponding candidate indication information thereof, as well as the device identification information; the signaling sending apparatus 23' sends the control signaling to the user equipment 1, wherein the control signaling comprises the at least one ePDCCH set and corresponding configuration information thereof, and at least one aggregation level and corresponding candidate indication information thereof, as well as the device identification information; correspondingly, the information receiving apparatus 11' of the user equipment 1 receives the control signaling from the base station 2, wherein the control signaling comprises at least one ePDCCH set and corresponding configuration information thereof, and at least one aggregation level and corresponding candidate indication information thereof, as well as device identification information, wherein the candidate indication information is used to determine the number of candidate ePDCCH(s) for each aggregation level; the eCCE determining unit 121' determines total number information of eCCE(s) available, based on the configuration information; the offset determining unit 122', according to the total number information of eCCE(s), determines eCCE location offset information for each aggregation level, based on the number of candidate ePDCCH(s) for each aggregation level; the index determining unit 123' determines candidate resource index information based on the eCCE location offset information along with the device identification information, wherein the candidate resource index information includes eCCE location information and/or eREG location information corresponding to said at least one aggregation level; the blind detection executing apparatus 13' performs the DCI blind detection operation based on the candidate resource index information, so as to obtain downlink control information corresponding to the control signaling. Here, the blind detection executing apparatus 13' is identical or basically identical with the apparatus in the corresponding embodiment in FIG. 1, in order for simplicity, details are no longer described and only included here in a way of quotation.

The configuration determining apparatus 21' of the base station 2 determines the at least one ePDCCH set and corresponding configuration information thereof, and at least one aggregation level and corresponding candidate indication information thereof, as well as the device identification information assigned for the user equipment 1, configured for the user equipment 1, wherein the candidate indication information is used to determine the number of candidate ePDCCH(s) for each aggregation level. Here, the device identification information may comprise RNTI (Radio Network Temporary Identity).

Here, the manner of determining at least one ePDCCH set and corresponding configuration information thereof, and at least one aggregation level and corresponding candidate indication information thereof, and the device identification information assigned for the user equipment 1, configured for the user equipment 1, performed by the configuration determining apparatus 21', is identical or basically identical with the manner of determining the at least one ePDCCH set and corresponding configuration information thereof, configured for the user equipment 1, performed by the configuration determining apparatus 21 in FIG. 1, in order for simplicity, details are no longer described and only included here in a way of quotation.

The signaling generating apparatus 22' generates a control signaling based on the at least one ePDCCH set and corresponding configuration information thereof, and the at least one aggregation level and corresponding candidate indication information thereof, as well as the device identification information. Here, the manner in which the signaling generating apparatus 22' generates the control signaling based on the at least one ePDCCH set and corresponding configuration information thereof, and the at least one aggregation level and corresponding candidate indication information thereof, as well as the device identification information is identical or basically identical with the manner in which the signaling generating apparatus 22 generates the control signaling based on the at least one ePDCCH set and corresponding configuration information thereof in FIG. 1, in order for simplicity, details are no longer described and only included here in a way of quotation.

The signaling sending apparatus 23' sends the control signaling to the user equipment 1 through a mobile network for example TD-LTE, wherein the control signaling comprises the at least one ePDCCH set and corresponding configuration information thereof, and the at least one aggregation level and corresponding candidate indication information thereof, as well as the device identification information.

Correspondingly, the information receiving apparatus 11' of the user equipment 1 receives the control signaling from the base station 2 via a mobile network such as TD-LTE, wherein the control signaling comprises at least one ePDCCH set and corresponding configuration information thereof, and at least one aggregation level and corresponding candidate indication information thereof, as well as device identification information, wherein the candidate indication information is used to determine the number of candidate ePDCCH(s) for each aggregation level. For example, the information receiving apparatus 11' receives a control signaling from the base station 2, wherein the control signaling comprises at least one ePDCCH set, e.g. ePDCCH set 1, and corresponding configuration information thereof, e.g., ePDCCH set 1 comprises 2 PRBs, and the at least one set level, for example, two aggregation levels such as L1=1 and L2=2, and corresponding candidate indication information thereof, for example, the candidate indication information corresponding to the aggregation L1=1 is that the number of candidate ePDCCHs is 6, the candidate indication information corresponding to L1=2 is that the number of candidate ePDCCHs is 6, and the device identification information of UE1 RNTI1.

Next, the eCCE determining unit 121' determines total number information of eCCE(s) available, based on the configuration information. For example, continuing the above example, the eCCE determining unit 121' determines that the total number information of eCCE(s) available $N_{eCCE,k}$ is twice or 4 times of the PRB number included in ePDCCH set 1, based on the configuration information received by the information receiving apparatus 11', for example, the ePDCCH set 1 comprises 2 PRBs, and the available RE (resource element) information of the 2 PRBs.

The offset determining unit 122', according to the total number information of eCCE(s), determines eCCE location offset information for each aggregation level, based on the number of candidate ePDCCH(s) for each aggregation level. For example, continuing the above example, based on the at least one aggregation level and corresponding candidate indication information thereof included in the control signaling received by the information receiving apparatus 11', two aggregation levels such as L1=1, L2=2, wherein the candidate indication information corresponding to the aggregation L1=1 is that the number of candidate ePDCCHs is 6, i.e., M(L)=6, the candidate indication information corresponding to L1=2 is that the number of candidate ePDCCHs is 6, i.e., M(L)=6, then the offset determining unit 122' may determine the eCCE location offset information for each aggregation level:

$$S_{eCCE}^L = \lfloor N_{eCCE,k}/M(L) \rfloor \quad (8)$$

Wherein, $N_{eCCE,k}$ is the total number information of eCCE, M(L) is the number of candidate ePDCCH(s) for each aggregation level.

The index determining unit 123' determines candidate resource index information based on the eCCE location offset information along with the device identification information, wherein the candidate resource index information includes eCCE location information and/or eREG location information corresponding to said at least one aggregation level.

Specifically, for the localized ePDCCH, the index determining unit 123' may determine the candidate resource index information according to equation (9):

$$m \cdot S_{eCCE}^L + L \cdot (U_{ID} \bmod U(L)) + i, m \in [0, M(L)-1], i \in [0, L-1] \quad (9)$$

Wherein U(L) defines the number of supported UE for the aggregation level L in one PRB pair group (or an ePDCCH set); L·($U_{ID}$ mod U(L)) is used to randomize the initial locations of UE's candidate resource. As shown in FIG. 4, it shows an index diagram of 4 PRBs with 16 eCCEs in one UE group for ePDCCH monitoring. From this figure, it can be found that each candidate in each aggregation level L is evenly distributed in available eCCEs, for one particular UE, the initial locations of all aggregation levels L is fixed to the same one eCCE in each PR. For example, if the eCCE index of UE1 is eCCE0, the it means for the aggregation level L1, (0, 4, 5, 9) are possible candidates of UE1 at the aggregation level L1; {(0,1), (4,5), (8,9), (12,13)} are possible candidates of UE1 at the aggregation level L4; for aggregation level L8, because one candidate is spread across two PRBs, so two continuous PRBs construct one candidate.

For the localized ePDCCH, eREG is used to construct the eCCE to achieve the diversity gain. FIG. 5 shows a diagram of 4 PRB pair scenario (16 eCCEs) for different aggregation levels. Here, the eREGs with the same location in each eCCE will construct one candidate, then the positions of the eREG in each eCCE will be used as indexes for different candidates for the same UE. As shown in FIG. 5, there are four candidates for L1. For UE1, its candidates may be always on eCCE0&4&8&12, allocated on eREG0, 1, 2, 3, respectively. In order to make it more clear in equation form, in one PRB, $S_{eCCE}^L$ is defined as location offset in horizontal orientation at the eCCE level; $S_{eREG}^L$ is the location offset in vertical orientation at the eREG level, then the candidate in eREG level may be expressed as:

$$S_{eCCE}^L = \lfloor N_{eCCE,k}/M(L) \rfloor \quad (10)$$

Then use the Y to show the eCCE index, while X to show the eREG index ($Y_{eCCE}$–$X_{eREG}$), then the candidate location can be expressed as:

$$Y_{eCCE} = \begin{cases} S_{eCCE}^L \cdot n + L \cdot (U_{ID} \bmod U(L)), n \in [0, L \cdot N_{eREG}], L = 1, 2, 4 \\ S_{eCCE}^L \cdot n + L \cdot (U_{ID} \bmod U(L)), n \in [0, L \cdot N_{eREG}/2], L = 8 \end{cases} \quad (11)$$

$$X_{eREG} = \begin{cases} m, m \in [0, M(L)-1], L = 1, 2, 4 \\ 2 \cdot m \,\&\, 2 \cdot m + 1, n \in [0, M(L)-1], L = 8 \end{cases} \quad (12)$$

Wherein $N_{eREG}$ denotes the number of eREG per eCCE.

Figure 7:
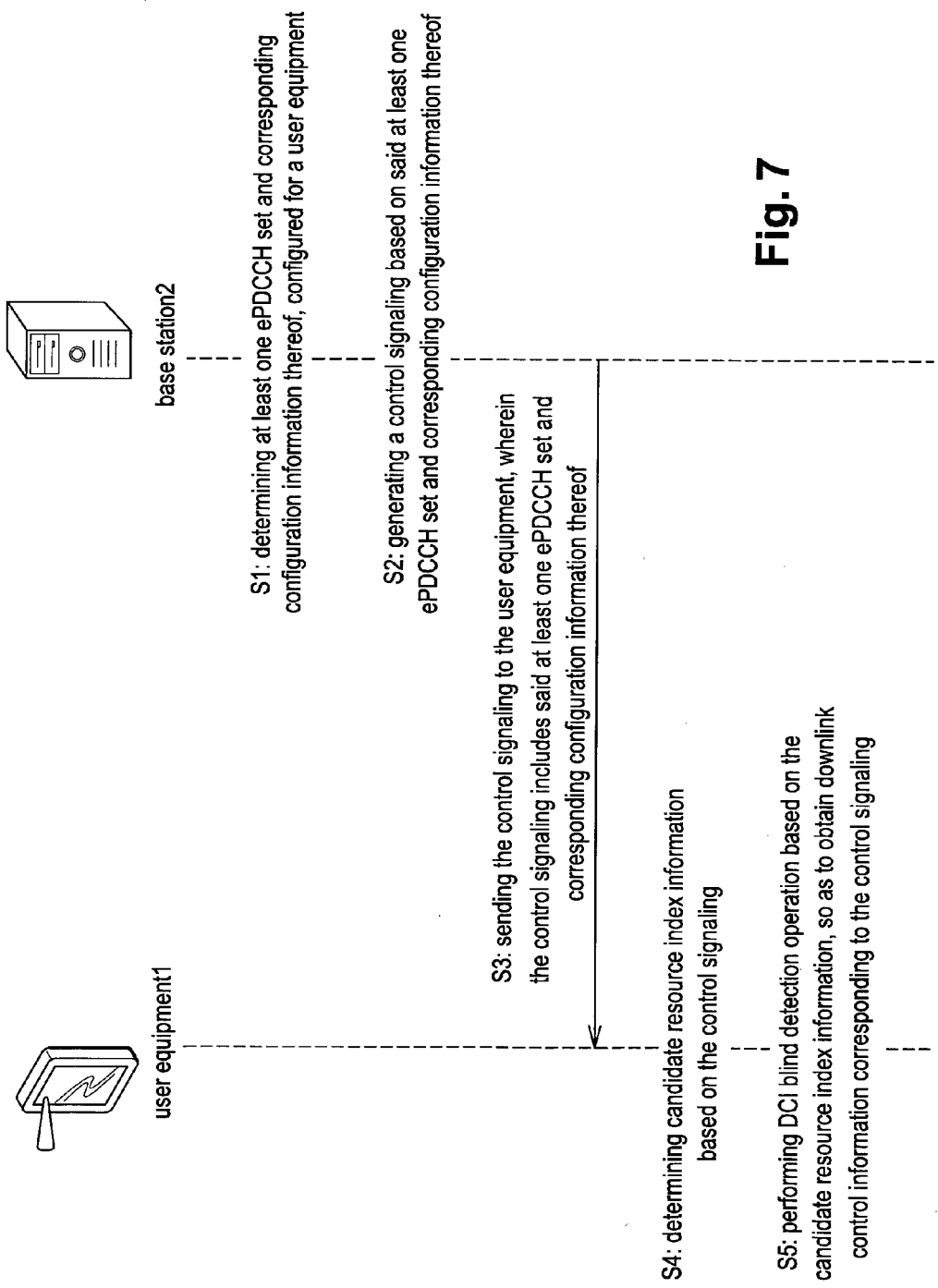
FIG. 7 is a flow chart illustrating a method for determining ePDCCH-based downlink control information accomplished by a user equipment in cooperation with a base station according to another aspect of the invention.

For another example, FIG. 6 shows a space search diagram of 4 PRB pairs (8 eCCEs), each eCCE having 8 eREGs; here, the eREGs with the same position in each eCCE will construct one candidate, and then the position of the eREGs in each eCCE will be used as the indexes of different candidates for the same UE. As shown in FIG. 7, there are four candidates for the aggregation level L2; for UE1, its 4 candidates will be spread to all eCCEs, allocated on eREG0&1, eREG 2&3, eREG 4&5, eREG 6&7 respectively. The following equations (13) and (14) show this scenario:

$$Y_{eCCE} = \quad (13)$$
$$\begin{cases} S_{eCCE}^L \cdot n + L \cdot (U_{ID} \bmod U(L)), n \in [0, L \cdot N_{eREG}/2], L = 1, 2 \\ S_{eCCE}^L \cdot n + L \cdot (U_{ID} \bmod U(L)), n \in [0, L \cdot N_{eREG}/4], L = 4, 8 \end{cases}$$

$$X_{eREG} = \quad (14)$$
$$\begin{cases} 2 \cdot m \,\&\, 2 \cdot m + 1, m \in [0, M(L)-1], L = 1, 2 \\ 4 \cdot m \,\&\, 4 \cdot m + 1 \,\&\, 4 \cdot m + 2 \,\&\, 4 \cdot m + 3, m \in [0, M(L)-1], L = 4 \\ \{0, 1, 2, 3, 4, 5, 6, 7\}, L = 8 \end{cases}$$

Those skilled in the art should understand that the above manners of determining candidate resource index information along with the device identification information are only exemplary, and other existing manner of determining candidate resource index information along with the device identification information or those that may possibly come out later should also be covered in the protection scope of the invention and included here in a way of quotation, if they are adaptable to this invention.

FIG. 7 is a flow chart illustrating a method for determining ePDCCH-based downlink control information accomplished by a user equipment in cooperation with a base station according to another aspect of the invention. Specifically, in the step S1, the base station 2 determines at least one ePDCCH set and corresponding configuration information thereof, configured for a user equipment; in the step S2, the base station 2 generates a control signaling based on said at least one ePDCCH set and corresponding configuration information thereof; in the step S3, the base station 2 sends the control signaling to the user equipment, wherein the control signaling includes said at least one ePDCCH set and corresponding configuration information thereof, correspondingly, the user equipment 1 receives a control signaling from an eNB, wherein the control signaling comprises at least one ePDCCH set and corresponding configuration information thereof; in the step S4, the user equipment 1 determines candidate resource index information based on the control signaling; in the step S5, the user equipment 1 performs DCI blind detection operation based on the candidate resource index information, so as to obtain the downlink control information corresponding to the control signaling.

Here, the user equipment refers to the part in mobile communication device, which terminates wireless transmission from or to the network and adapts the capability of a terminal device to the wireless transmission, i.e., the device for a user to access to the mobile network, which includes, but not limited to, any electronic product that performs human-machine interaction with the user through a keyboard, a touch pad, or a voice-control device, and implements transmission of mobile communication signals through mutual transmission and reception of signals between a mobile network and a base station, for example, a tablet, a smart mobile phone, a PDA, a vehicle mount computer, etc. Here, the base station refers to a device in mobile communication system, which connects a fixed part and a wireless part and is connected to a mobile station through air wireless transmission, for example, eNB (evolved Node B). Here, the mobile network includes, but not limited to, GSM, 3G, TD-LTE, Wi-Fi, WiMax, WCDMA, CDMA2000, TD-SCDMA, HSPA, LTS, etc. Those skilled in the art should understand that the aforesaid user equipment, base station, and mobile networks are only examples, other existing user equipments, base stations, and mobile networks or those that may possibly come out later should also be covered in the protection scope of the invention and included here in a way of quotation, if they are adaptable to this invention.

Specifically, in the step S1, the base station 2 may determine at least one ePDCCH set and corresponding configuration information thereof, configured for user equipment 1, based on the current schedulable resource information, interference information from one or more cells adjacent to the base station, and downlink channel relevant information of the user equipment (for example, channel quality and other information affecting the channel quality such as network condition, etc.), and the like. Here, the configuration information includes number information N of the PRB pairs and locations thereof, occupied by a ePDCCH set. For example, suppose a base station eNB determines that the downlink channel quality of UE1 is good based on the CQI (channel quality indication) reported by UE1, then in the step S1, the base station 2 configures one ePDCCH set, e.g. ePDCCH set 1, and corresponding configuration information thereof, for UE1, such as ePDCCH set 1 comprises 2 PRBs and the location information location 1 corresponding to the 2 PRBs; if the base station eNB determines that the downlink channel quality of UE2 is bad based on the CQI (channel quality indication) reported by UE2, then in the step S1, the base station 2 configures two ePDCCH sets, e.g. ePDCCH set 2 and ePDCCH set 3, and their respective corresponding configuration information, for UE2, for example, ePDCCH set 2 includes 2 PRBs, ePDCCH set 3 includes 2 PRBs, and the location information location 2 corresponding to the 2 PRBs included in ePDCCH set 2, and location information location 3 corresponding to the 2 PRBs included in the ePDCCH set 3.

Those skilled in the art should understand that the aforesaid manner of determining the at least one ePDCCH set configured for the user equipment and corresponding configuration information thereof is only an exempla, other existing manner of determining at least one ePDCCH set configured for the user equipment and corresponding configuration information thereof or those that may possibly come out later should also be covered in the protection scope of the invention and included here in a way of quotation, if they are adaptable to this invention.

In the step S2, the base station 2 generates a control signaling based on the at least one ePDCCH set and corresponding configuration information thereof. Here, the control signaling is for indicating a user equipment to perform reception of the ePDCCH, which may include, but not limited to, for example, RRC (Radio Resource Control). For example, suppose in the step S1, the base station 2 determines to configure one ePDCCH set, for example, ePDCCH set 1, and corresponding configuration information thereof, for UE1, such as ePDCCH set 1 comprises 2 PRBs and the location information location 1 corresponding to the 2 PRBs, then in the step S2, the base station 2 generates the control signaling for example RRC1 based on the ePDCCH set 1 and corresponding configuration information thereof, for example, the ePDCCH set 1 comprises 2 PRBs, and the location information location 1 corresponding to the 2 PRBs.

Those skilled in the art should understand that the aforesaid manner of generating a control signaling is only an example, and other existing manner of generating a control signaling or those that may possibly come out later should also be covered in the protection scope of the invention and included here in a way of quotation, if they are adaptable to this invention.

In the step S3, the base station 2 sends the control signaling to the user equipment via a mobile network, for example, TD-LTE (Time Division Long Term Evolution), wherein the control signaling comprises the at least one ePDCCH set and corresponding configuration information thereof.

Correspondingly, the user equipment 1 receives the control signaling from the eNB via a mobile network, for example a TD-LTE, wherein the control signaling comprises at least one ePDCCH set and corresponding configuration information thereof.

In the step S4, the user equipment 1 determines candidate resource index information based on the control signaling, via for example, a predetermined hash function. Here, the candidate resource index is used to perform decoding, RNYI descrambling, CRC check, etc., based on eCCE (enhanced-Control Channel Element) and/or eREG (enhanced-Resource Element Groups) of corresponding location, so as to obtain the DCI (Downlink Control Information) sent by the eNB, which includes, but not limited to, for example: 1) the index of eCCE or/and the index of eREG; 2) initial location of the eCCG and initial location of eREG. Here, the aforesaid traditional Hash function may be modified according to equations (1) and (2) to obtain a hash function suitable for ePHDCCH, for example, an equation. It may be seen from equations (1) and (2) that the UE-specific searching space results in a group of neighboring candidates (in terms of CCEs) are evenly allocated in all available CCEs.

Based on equations (1) and (2), for localized ePDCCH searching space, the above average allocation manner can be shared based on the concepts of the ePDCCH and UE group.

Here, a new parameter $N_{eCCE,k}^n$ is defined, which indicates the total number of eCCEs available in the UE need to be monitor. Thus, for the localized ePDCCH, equations (1) and (2) can be modified to equations (3) and (4), thereby obtaining a new hash function:

$$L\{(Y_k+m) \bmod \lfloor N_{eCCE,k}^n/L \rfloor\}+i \quad (3)$$

$$Y_k=(A \cdot Y_{k-1}) \bmod D \quad (4)$$

For distributed ePDCCH, considering the diversity gain, equations (3) and (4) may be designed in eREG level. According to the current protocol, no matter how many eCCEs in one PRB, the number of eREGs is fixed to 16. This makes the unified design for searching space more easily. Thus, equations (3) and (4) can be modified to equations (5) and (6):

$$\{(Y_k+m) \bmod \lfloor N_{eREG,k}^n/L_{eREG} \rfloor + D_{m,L,k}\} + i_{eREG,L} \cdot \lfloor N_{eREG,k}^n/L_{eREG} \rfloor \quad (5)$$

$$Y_k=(A \cdot Y_{k-1}) \bmod D \quad (6)$$

Wherein, $D_{m,L,k}=m \cdot \lfloor \lfloor N_{eCCE,k}^n/L_{eREG} \rfloor / M(L) \rfloor$, $N_{eREG,k}^n$ is the total configured eREG number of a specific UE, while $L_{eREG}$ is the eREG number for each aggregation level L, $i_{eREG,L}=0, 1, \ldots L_{eREG}-1$ is the corresponding value for each aggregation level L depending on the eCCE definition, M(L) is the candidate number for each aggregation level L, $D_{m,L,k}$ is the offset value to allocate call candidate evenly into all available eREGs. Based on equations (5) and (6), the candidate number for each aggregation level L is restricted by the total available eREG numbers, namely, $$M(L) \leq \lfloor N_{eCCE,k}^n/L_{eREG} \rfloor \quad (7)$$

Based on the above hash function, it should be noted that the eCCE and eREG sequences should be the same order for all PRBs, and a global eCCE index or eREG indexed for all eCCEs/eREGs configured to an UE for monitoring should be designed, for example, FIG. 2 shows the sequence order of 4 PRBs with 4 eCCEs per PRB.

Here, in order to make design of the searching space easier and more effective, the above hash function method is based on some working assumptions. According to the current protocol, there is no discussion about the resource allocation relationships for ePDCCH sets from different UEs, which means that there is no restriction about resource allocation for the ePDCCH sets from different UEs. However, considering the blocking possibility and effective searching space design, it is not preferred to have partially overlap resource allocations from different UE groups. Another explanation is that the eNB should not configure the ePDCCH for all ePDCCH configured UEs based on the following working assumptions:

Working assumption 1: Separate the configured UEs into several UE groups;

Working assumption 2: For the UEs in one UE group, they share the same PRB pairs to be monitored;

Working assumption 3: For the UEs in different UE groups, the PRBs allocated to be monitored should be in orthogonal way.

Here, it should be emphasized that because the ePDCCH is totaly configured by the eNB, if the configuration of the eNB can effectively avoid the blocking problem among all scheduled UEs, and then the above working assumptions might be not needed. Thus, for one UE, it might only have one ePDCCH set for localized candidates, while another ePDCCH set for distributed candidates. These two sets may be partially overlapped. In this case, those skilled in the art should understand that the above hash function method may also be applied, just restrict the available eCCE or eREG numbers in one ePDCCH set in UE-specific manner, instead of groups UEs.

Those skilled in the art should understand that the above manner of modifying the existing hash function is only an example, and other existing manner of modifying the existing hash function or those that may possibly come out later should also be covered in the protection scope of the invention and included here in a way of quotation, if they are adaptable to this invention.

Those skilled in the art should understand that the above manner of determining candidate resource index information is only an example, and other currently existing manner of determining candidate resource index information or those that may possibly come out later should also be covered in the protection scope of the invention and included here in a way of quotation, if they are adaptable to this invention.

Preferably, in the step S4, the user equipment 1 may also, according to the control signaling, determine candidate resource index information based on a predetermined hash function, wherein the hash function includes parameter information of total number of eCCE(s) and/or eREG(s), available and necessary for monitoring.

For example, in the step S4, the user equipment 1, according to the control signaling received from in the step S3, determines the candidate resource index information based on the corresponding hash function applied to the localized ePDCCH corresponding to the above equations (3) and (4), or based on the hash function applied to the distributed ePDCCH corresponding to the above equations (5) and (6), wherein the hash function corresponding to the equations (3) and (4) include parameter information of total number of eCCE(s), available and necessary for monitoring, such as $N_{eCCE,k}^n$, and the hash function corresponding to the equations (5) and (6) includes parameter information of total number of eREG(s), available and necessary for monitoring, for example, $N_{eEGE,k}^n$.

Those skilled in the art should understand that the above manner of determining candidate resource index information based on the predetermined hash function is only an example, and other existing manner of determining candidate resource index information based on the predetermined hash function or those that may possibly come out later should also be covered in the protection scope of the invention and included here in a way of quotation, if they are adaptable to this invention.

In the step S5, the user equipment 1 performs the DCI blind detection operation based on the candidate resource index information so as to obtain downlink control information corresponding to the control signaling. For example, in the step S5, the user equipment 1 executes the DCI blind detection operation based on the candidate resource index information determined by the user equipment 1, in the step S4, for example, performing decoding, RNTI descrambling, CRC check, etc., based on the eCCE and/or eREG at the initial location corresponding to the candidate resource index information, to determine whether the CRC is correct; if the CRC is determined to be correct, the check will not be performed any more, and then the DCI format is determined based on its length, i.e., obtaining the DCI sent by the eNB; if the CRC is determined to be incorrect, then a second eCCE and/or eREG is searched, and after completion of searching at one aggregation level, the search at the next aggregation level is performed, till obtaining the information required by the UE.

Those skilled in the art should understand that the above manner of executing DCI blind detection operation is only an example, and other currently existing manner of executing DCI blind detection operation those that may possibly come out later should also be covered in the protection scope of the invention and included here in a way of quotation, if they are adaptable to this invention.

The various steps of user equipment 1 and base station 2 works continuously between each other. Specifically, in the step S1, the base station 2 continuously determines at least one ePDCCH set and corresponding configuration information thereof configured for user equipment 1; in the step S2, the base station 2 continuously generates a control signaling based on the at least one ePDCCH set and corresponding configuration information thereof; in the step S3, the base station 2 continuously sends the control signaling to the user equipment, wherein the control signaling includes at least one ePDCCH set and corresponding configuration information thereof; in the step S4, the user equipment 1 continuously determines candidate resource index information based on the control signaling; in the step S5, the user equipment 1 continuously executes the DCI blind detection operation based on the candidate resource index information so as to obtain the downlink control information corresponding to the control signaling. Here, those skilled in the art should understand that "continuously" means the various steps of user equipment 1 and base station 2 continuously determine the ePDCCH set and corresponding configuration information thereof, generate a control signaling, send and receive the control signaling, determine the candidate resource index information, and perform DCI blind detection operation, till the base station 2 stops determining the ePDCCH set and corresponding configuration information thereof within a relatively long time.

In one preferred embodiment (see FIG. 7). Specifically, in the step S1, the base station 2 determines at least one ePDCCH set and corresponding configuration information thereof, and at least one aggregation level and corresponding candidate indication information thereof, configured for the user equipment, wherein the candidate indication information is used to determine the number of candidate ePDCCH(s) for each aggregation level; in the step S2, the base station 2 generates a control signaling based on the at least one ePDCCH set and corresponding configuration information thereof, and the at least one aggregation level and corresponding candidate indication information thereof; in the step S3, the base station 2 sends the control signaling to the user equipment, wherein the control signaling comprises at least one ePDCCH set and corresponding configuration information thereof, and at least one aggregation level and corresponding candidate indication information thereof; correspondingly, the user equipment 1 receives the control signaling from the base station 2, wherein the control signaling comprises at least one ePDCCH set and corresponding configuration information thereof, and at least one aggregation level and corresponding candidate indication information thereof, wherein the candidate indication information is used to determine the number of candidate ePDCCH(s) for each aggregation level; in the step S4, the user equipment 1, according to the control signaling, determines candidate resource index information based on a predetermined hash function, wherein the hash function includes parameter information about total number of eCCE(s) and/or eREG(s), necessary for monitoring and available, wherein the candidate resource index information includes eCCE index information and/or eREG index information corresponding to said at least one aggregation level; in the step S5, the user equipment 1 performs DCI blind detection operation based on the candidate resource index information so as to obtain downlink control information corresponding to the control signaling. Here, in the step S5, the user equipment 1 is same as or basically identical with the apparatus in the corresponding embodiment of FIG. 7, in order for simplicity, details are no longer described and only included here in a way of quotation.

Specifically, in the step S1, the base station 2 determines at least one ePDCCH set configured for user equipment 1 and corresponding configuration information thereof, and at least one aggregation level and corresponding candidate indication information thereof, wherein the candidate indication information is for determining the number of candidate ePDCCHs corresponding to respective aggregation levels. Here, the aggregation level and corresponding candidate indication information thereof are both configurable and sent by base station 2; if the base station 2 does not send the aggregation level and corresponding candidate indication information thereof, it follows the prior art, i.e., following the rules corresponding to the existing hash function equations (1) and (2), and the aggregation level and corresponding candidate indication information thereof are fixedly set.

Here, the manner of determining at least one ePDCCH set configured for user equipment 1 and corresponding configuration information thereof, and at least one aggregation level and corresponding candidate indication information thereof as performed by the base station 2 in the step S1 is identical or basically identical with the manner of determining the at least one ePDCCH set configured for the user equipment and corresponding configuration information thereof as performed by the base station 2 in the step S1 in FIG. 7, in order for simplicity, details are no longer described and only included here in a way of quotation.

In the step S2, the base station 2 generates a control signaling based on the at least one ePDCCH set and corresponding configuration information thereof, and the at least one aggregation level and corresponding candidate indication information thereof. Here, the manner of generating a control signaling based on the at least one ePDCCH set and corresponding configuration information thereof, and the at least one aggregation level and corresponding candidate indication information thereof as performed by the base station 2 in the step S2 is identical or basically identical with the manner of generating a control signaling based on the at least one ePDCCH set and corresponding configuration information thereof as performed by the base station 2 in the step S2 in FIG. 7, in order for simplicity, details are no longer described and only included here in a way of quotation.

In the step S3, the base station 2 sends the control signaling to the user equipment through a mobile network for example, a TD-LTE, wherein the control signaling comprises the at least ePDCCH set and corresponding configuration information thereof, and at least one aggregation level and corresponding candidate indication information thereof.

Correspondingly, the user equipment 1 receives a control signaling from the base station 2 through a mobile network for example TD-LTE, wherein the control signaling comprises at least one ePDCCH set and corresponding configuration information thereof, and at least one aggregation level and corresponding candidate indication information thereof, wherein the candidate indication information is used to determine the number of candidate ePDCCH(s) for each aggregation level.

In the step S4, the user equipment 1, according to the control signaling, determines candidate resource index information based on a predetermined hash function, wherein the hash function includes parameter information about total number of eCCE(s) and/or eREG(s), necessary for monitoring and available, wherein the candidate resource index information includes eCCE index information and/or eREG index information corresponding to said at least one aggregation level.

For example, suppose in the step 3, the user equipment 1 receives a control signaling from a base station 2, wherein the control signaling comprises at least one ePDCCH set, e.g. ePDCCH set 1, and corresponding configuration information thereof, for example, ePDCCH set 1 comprises 2 PRBs, and at least one aggregation level, for example, two aggregation levels such as L1=1 and L2=2, and corresponding candidate indication information thereof, for example, the candidate indication information corresponding to aggregation L1=1 is that the number of candidate ePDCCHs is 6, the candidate indication information corresponding to L1=2 is that the number of candidate ePDCCHs is 6, then in the step S4, the user equipment 1 determines the candidate resource index information based on the predetermined hash function according to the control signaling, for example, based on the hash function applied to localized ePDCCH corresponding to the equations (3) and (4), or the hash function applied to the distributed ePDCCH corresponding to the above equations (5) and (6), wherein the hash function corresponding to equations (3) and (4) includes parameter information about total number of eCCE(s), necessary for monitoring and available, such as $N_{eCCE,k}^n$; the hash function corresponding to the above equations (5) and (6) includes parameter information about total number of eREG(s), necessary for monitoring and available, such as $N_{eEGE,k}^n$.

FIG. 8 is a flow chart illustrating a method for determining ePDCCH-based downlink control information accomplished by a user equipment in collaboration with a base station according to a preferable embodiment of the invention. Specifically, in the step S1', the base station 2 determines at least one ePDCCH set and corresponding configuration information thereof, and at least one aggregation level and corresponding candidate indication information thereof, as well as device identification information assigned to the user equipment 1, configured for the user equipment 1, wherein the candidate indication information is used to determine the number of candidate ePDCCH(s) for each aggregation level; in the step S2', the base station 2 generates a control signaling based on said at least one ePDCCH set and corresponding configuration information thereof, and said at least one aggregation level and corresponding candidate indication information thereof, as well as the device identification information; in the step S3', the base station 2 sends the control signaling to the user equipment 1, wherein the control signaling comprises the at least one ePDCCH set and corresponding configuration information thereof, and at least one aggregation level and corresponding candidate indication information thereof, as well as the device identification information; correspondingly, the user equipment 1 receives the control signaling from the base station 2, wherein the control signaling comprises at least one ePDCCH set and corresponding configuration information thereof, and at least one aggregation level and corresponding candidate indication information thereof, as well as device identification information, wherein the candidate indication information is used to determine the number of candidate ePDCCH(s) for each aggregation level; in the step S41', the user equipment 1 determines total number information of eCCE(s) available, based on the configuration information; in the step S42', the user equipment 1, according to the total number information of eCCE(s), determines eCCE location offset information for each aggregation level, based on the number of candidate ePDCCH(s) for each aggregation level; in the step S43', the user equipment 1 determines candidate resource index information based on the eCCE location offset information along with the device identification information, wherein the candidate resource index information includes eCCE location information and/or eREG location information corresponding to said at least one aggregation level; in the step S5', the user equipment 1 performs the DCI blind detection operation based on the candidate resource index information, so as to obtain downlink control information corresponding to the control signaling. Here, in the step S5', the user equipment 1 is identical or basically identical with the apparatus in the corresponding embodiment in FIG. 1, in order for simplicity, details are no longer described and only included here in a way of quotation.

In the step S1', the base station 2 determines the at least one ePDCCH set and corresponding configuration information thereof, and at least one aggregation level and corresponding candidate indication information thereof, as well as the device identification information assigned for the user equipment 1, configured for the user equipment 1, wherein the candidate indication information is used to determine the number of candidate ePDCCH(s) for each aggregation level. Here, the device identification information may comprise RNTI (Radio Network Temporary Identity).

Here, the manner of determining at least one ePDCCH set and corresponding configuration information thereof, and at least one aggregation level and corresponding candidate indication information thereof, and the device identification information assigned for the user equipment 1, configured for the user equipment 1, performed by the base station 2 in the step S1', is identical or basically identical with the manner of determining the at least one ePDCCH set and corresponding configuration information thereof, configured for the user equipment 1, performed by the base station 2 in the step S1' in FIG. 7, in order for simplicity, details are no longer described and only included here in a way of quotation.

In the step S2', the base station 2 generates a control signaling based on the at least one ePDCCH set and corresponding configuration information thereof, and the at least one aggregation level and corresponding candidate indication information thereof, as well as the device identification information. Here, the manner in which in the step S2', the base station 2 generates the control signaling based on the at least one ePDCCH set and corresponding configuration information thereof, and the at least one aggregation level and corresponding candidate indication information thereof, as well as the device identification information is identical or basically identical with the manner in which in the step S2', the base station 2 generates the control signaling based on the at least one ePDCCH set and corresponding configuration information thereof in FIG. 7, in order for simplicity, details are no longer described and only included here in a way of quotation.

In the step S3', the base station 2 sends the control signaling to the user equipment 1 through a mobile network for example TD-LTE, wherein the control signaling comprises the at least one ePDCCH set and corresponding configuration information thereof, and the at least one aggregation level and corresponding candidate indication information thereof, as well as the device identification information.

Correspondingly, the user equipment 1 receives the control signaling from the base station 2 via a mobile network such as TD-LTE, wherein the control signaling comprises at least one ePDCCH set and corresponding configuration information thereof, and at least one aggregation level and corresponding candidate indication information thereof, as well as device identification information, wherein the candidate indication information is used to determine the number of candidate ePDCCH(s) for each aggregation level. For example, in the step S3', the user equipment 1 receives a control signaling from the base station 2, wherein the control signaling comprises at least one ePDCCH set, e.g. ePDCCH set 1, and corresponding configuration information thereof, e.g., ePDCCH set 1 comprises 2 PRBs, and the at least one set level, for example, two aggregation levels such as L1=1 and L2=2, and corresponding candidate indication information thereof, for example, the candidate indication information corresponding to the aggregation L1=1 is that the number of candidate ePDCCHs is 6, the candidate indication information corresponding to L1=2 is that the number of candidate ePDCCHs is 6, and the device identification information of UE1 RNTI1.

Next, in the step S41', the user equipment 1 determines total number information of eCCE(s) available, based on the configuration information. For example, continuing the above example, in the step S41', the user equipment 1 determines that the total number information of eCCE(s) available $N_{eCCE,k}$ is twice or 4 times of the PRB number included in ePDCCH set 1, based on the configuration information received by the user equipment 1 in the step 3', for example, the ePDCCH set 1 comprises 2 PRBs, and the available RE (resource element) information of the 2 PRBs.

In the step S42', the user equipment 1, according to the total number information of eCCE(s), determines eCCE location offset information for each aggregation level, based on the number of candidate ePDCCH(s) for each aggregation level. For example, continuing the above example, based on the at least one aggregation level and corresponding candidate indication information thereof included in the control signaling received by the user equipment 1 in the step 3', two aggregation levels such as L1=1, L2=2, wherein the candidate indication information corresponding to the aggregation L1=1 is that the number of candidate ePDCCHs is 6, i.e., M(L)=6, the candidate indication information corresponding to L1=2 is that the number of candidate ePDCCHs is 6, i.e., M(L)=6, then in the step S42', the user equipment 1 may determine the eCCE location offset information for each aggregation level:

$$S_{eCCE}^L = \lfloor N_{eCCE,k}/M(L) \rfloor \quad (8)$$

Wherein, $N_{eCCE,k}$ is the total number information of eCCE, M(L) is the number of candidate ePDCCH(s) for each aggregation level.

In the step S43', the user equipment 1 determines candidate resource index information based on the eCCE location offset information along with the device identification information, wherein the candidate resource index information includes eCCE location information and/or eREG location information corresponding to said at least one aggregation level.

Specifically, for the localized ePDCCH, in the step S43', the user equipment 1 may determine the candidate resource index information according to equation (9):

$$m \cdot S_{eCCE}^L + L \cdot (U_{ID} \bmod U(L)) + i, m \in [0, M(L)-1], i \in [0, L-1] \quad (9)$$

Wherein U(L) defines the number of supported UE for the aggregation level L in one PRB pair group (or an ePDCCH set); $L \cdot (U_{ID} \bmod U(L))$ is used to randomize the initial locations of UE's candidate resource. As shown in FIG. 4, it shows an index diagram of 4 PRBs with 16 eCCEs in one UE group for ePDCCH monitoring. From this figure, it can be found that each candidate in each aggregation level L is evenly distributed in available eCCEs, for one particular UE, the initial locations of all aggregation levels L is fixed to the same one eCCE in each PR. For example, if the eCCE index of UE1 is eCCE0, the it means for the aggregation level L1, (0, 4, 5, 9) are possible candidates of UE1 at the aggregation level L1; {(0,1), (4,5), (8,9), (12,13)} are possible candidates of UE1 at the aggregation level L4; for aggregation level L8, because one candidate is spread across two PRBs, so two continuous PRBs construct one candidate.

For the localized ePDCCH, eREG is used to construct the eCCE to achieve the diversity gain. FIG. 5 shows a diagram of 4 PRB pair scenario (16 eCCEs) for different aggregation levels. Here, the eREGs with the same location in each eCCE will construct one candidate, then the positions of the eREG in each eCCE will be used as indexes for different candidates for the same UE. As shown in FIG. 5, there are four candidates for L1. For UE1, its candidates may be always on eCCE0&4&8&12, allocated on eREG0, 1, 2, 3, respectively. In order to make it more clear in equation form, in one PRB, $S_{eCCE}^L$ is defined as location offset in horizontal orientation at the eCCE level; $S_{eREG}^L$ is the location offset in vertical orientation at the eREG level, then the candidate in eREG level may be expressed as:

$$S_{eCCE}^L = \lfloor N_{eCCE,k}/M(L) \rfloor \quad (10)$$

Then use the Y to show the eCCE index, while X to show the eREG index ($Y_{eCCE}$–$X_{eREG}$), then the candidate location can be expressed as:

$$Y_{eCCE} = \begin{cases} S_{eCCE}^L \cdot n + L \cdot (U_{ID} \bmod U(L)), n \in [0, L \cdot N_{eREG}], L = 1, 2, 4 \\ S_{eCCE}^L \cdot n + L \cdot (U_{ID} \bmod U(L)), n \in [0, L \cdot N_{eREG}/2], L = 8 \end{cases} \quad (11)$$

$$X_{eREG} = \begin{cases} m, m \in [0, M(L)-1], L = 1, 2, 4 \\ 2 \cdot m \,\&\, 2 \cdot m + 1, n \in [0, M(L)-1], L = 8 \end{cases} \quad (12)$$

Wherein $N_{eREG}$ denotes the number of eREG per eCCE.

For another example, FIG. 6 shows a space search diagram of 4 PRB pairs (8 eCCEs), each eCCE having 8 eREGs; here, the eREGs with the same position in each eCCE will construct one candidate, and then the position of the eREGs in each eCCE will be used as the indexes of different candidates for the same UE. As shown in FIG. 7, there are four candidates for the aggregation level L2; for UE1, its 4 candidates will be spread to all eCCEs, allocated on eREG0&1, eREG 2&3, eREG 4&5, eREG 6&7 respectively. The following equations (13) and (14) show this scenario:

$$Y_{eCCE} = \quad (13)$$
$$\begin{cases} S_{eCCE}^L \cdot n + L \cdot (U_{ID} \bmod U(L)), n \in [0, L \cdot N_{eREG}/2], L = 1, 2 \\ S_{eCCE}^L \cdot n + L \cdot (U_{ID} \bmod U(L)), n \in [0, L \cdot N_{eREG}/4], L = 4, 8 \end{cases}$$

$$X_{eREG} = \quad (14)$$
$$\begin{cases} 2 \cdot m \,\&\, 2 \cdot m + 1, m \in [0, M(L)-1], L = 1, 2 \\ 4 \cdot m \,\&\, 4 \cdot m + 1 \,\&\, 4 \cdot m + 2 \,\&\, 4 \cdot m + 3, m \in [0, M(L)-1], L = 4 \\ \{0, 1, 2, 3, 4, 5, 6, 7\}, L = 8 \end{cases}$$

Those skilled in the art should understand that the above manners of determining candidate resource index information along with the device identification information are only exemplary, and other existing manner of determining candidate resource index information along with the device identification information or those that may possibly come out later should also be covered in the protection scope of the invention and included here in a way of quotation, if they are adaptable to this invention.

It needs to note that the present invention can be implemented in software and/or a combination of software and hardware, for example, the invention can be implemented by using an Application Specific Integrated Circuit (ASIC), a general purpose computer or any other similar hardware equipment. In one embodiment, the software program of this invention can be executed by a processor to accomplish the aforesaid steps or functions. Likewise, the software program (including the relevant data structure) of the invention can be stored in a computer readable recording medium, for example, RAM memory, magneto-optical drive or floppy disk and similar devices. In addition, some steps or functions of the invention can be realized by using hardware, for example, a circuit that cooperates with the processor to perform various steps or functions.

In addition, part of the invention can be applied as a computer program product, such as a computer program instruction, when the instruction is executed by the computer, the method and/or technical solution according to this invention may be called or provided through an operation of the computer. However, the program instruction for calling the method of the invention may possibly be stored in a fixed or movable recording medium, and/or be transmitted via broadcasting or other signal carrier mediums, and/or be stored in the operation memory of a computer device that is running according to said program instruction. Here, there is one device included according to an embodiment of the invention, said device comprises a memory for storing computer program instructions and a processor for executing program instructions, this device is triggered to operate the methods and/or technical solutions based on the aforesaid embodiments of the invention when the computer program instructions are executed by said processor.

To those skilled in the art, apparently the present invention is not limited to the details of the aforementioned exemplary embodiments, moreover, under the premise of not deviating from the spirit or fundamental characteristics of the invention, this invention can be accomplished in other specific forms. Therefore, the embodiments should be considered exemplary and non-restrictive no matter from which point, the scope of the invention is defined by the appended claims instead of the above description, and aims at covering the meanings of the equivalent components falling into the claims and all changes within the scope in this invention. Any reference sign in the claims shall not be deemed as limiting the concerned claims. Besides, apparently the word "comprise/include" does not exclude other components or steps, singular numbers does not exclude complex numbers, the plurality of components or means mentioned in device claims may also be accomplished by one component or means through software or hardware, the wording like first and second are only used to represent names rather than any specific order.

We claim:

1. A method for determining ePDCCH-based downlink control information at a user equipment, the method comprising:

receiving a control signaling from an eNB, wherein the control signaling comprises at least one ePDCCH set and corresponding configuration information thereof;

determining candidate resource index information based on the control signaling based on a predetermined hash function $$\{(Y_k+m) \bmod [N_{eREG,k}{}^n/L_{eREG}]+D_{m,L,K}\}+i_{eREG,L} \cdot [N_{eREG,k}{}^n/L_{eREG}]$$

where $Y_k=(A \cdot Y_{k-1}) \bmod D$, where $N_{eREG,k}{}^n$ is the total configured eREG—enhanced-Resource Element Group—number of the specific UE, $L_{eREG}$ is the eREG number for each aggregation level L, $D_{m,L,K}=m \cdot \{[N_{eCCE,k}{}^n/L_{eREG}]/M(L)\}$, $i_{eREG,L}=0, 1, \ldots, L_{eREG}-1$ is the corresponding value for each aggregation level L depending on the eCCE—enhanced-Control Channel Element—definition, M(L) is the candidate number for each aggregation level L, $D_{m,L,K}$ is the offset value to allocate all candidates evenly into all available eREGs, and an eCCE—enhanced-control Channel Element—location offset information $S_{eCCE}{}^L=[N_{eCCE,K}/M(L)]$ where $S_{eCCE}{}^L$ is the location offset information for each aggregation level, $N_{eCCE,K}$ is the total number of eCCEs available, and M(L) is the candidate number for each Aggregation Level;

performing DCI blind detection operation based on the candidate resource index information, so as to obtain downlink control information corresponding to the control signaling.

2. The method according to claim 1, wherein the determining comprises:

according to the control signaling, determining candidate resource index information based on a predetermined hash function, wherein the hash function includes parameter information of total number of eCCEs and eREGs, available and necessary for monitoring.

3. The method according to claim 1, wherein the receiving comprises:

receiving a control signaling from an eNB, wherein the control signaling includes at least one ePDCCH set and corresponding configuration information thereof, as well as at least one aggregation level and corresponding candidate indication information thereof, wherein the candidate indication information is used to determine the number of candidate ePDCCHs for each aggregation level;

wherein, the determining comprises:

according to the control signaling, determining candidate resource index information based on a predetermined hash function, wherein the hash function includes parameter information about total number of eCCEs and eREGs, necessary for monitoring and available, wherein the candidate resource index information includes eCCE index information and/or eREG index information corresponding to the at least one aggregation level.

4. The method according to claim 1, wherein the receiving comprises:

receiving a control signaling from an eNB, wherein the control signaling comprises at least one ePDCCH set and corresponding configuration information thereof, at least one aggregation level and corresponding candidate indication information thereof, and device identification information, wherein the candidate indication information is used to determine the number of candidate ePDCCHs for each aggregation level;
wherein the determining comprises:
  determining total number information of eCCEs available, based on the configuration information;
  according to the total number information of eCCEs, determining eCCE location offset information for each aggregation level, based on the number of candidate ePDCCHs for each aggregation level;
  determining candidate resource index information based on the eCCE location offset information along with the device identification information, wherein the candidate resource index information includes eCCE location information and/or eREG location information corresponding to the at least one aggregation level.

5. A method for auxiliary determining ePDCCH-based downlink control information at an eNB, the method comprising:
  determining at least one ePDCCH set and corresponding configuration information thereof, configured for a user equipment;
  generating a control signaling based on the at least one ePDCCH set and corresponding configuration information thereof
based on a predetermined hash function $$\{(Y_k+m) \bmod [N_{eREG,k}^n/L_{eREG}] + D_{m,L,K}\} + i_{eREG,L} \cdot [N_{eREG,k}^n/L_{eREG}]$$

where $Y_k = (A \cdot Y_{k-1}) \bmod D$,
  where $N_{eREG,k}^n$ is the total configured eREG—enhanced-Resource Element Group—number of the specific UE,
  $L_{eREG}$ is the eREG number for each aggregation level L,
  $D_{m,L,K} = m \cdot \{[N_{eCCE,k}^n/L_{eREG}]/M(L)\}$,
  $i_{eREG,L} = 0, 1, \ldots, L_{eREG}-1$ is the corresponding value for each aggregation level L depending on the eCCE—enhanced-Control Channel Element—definition,
  M(L) is the candidate number for each aggregation level L,
  $D_{m,L,K}$ is the offset value to allocate all candidates evenly into all available eREGs, and
  an eCCE—enhanced-control Channel Element—location offset information $S_{eCCE}^L = [N_{eCCE,K}/M(L)]$
  where $S_{eCCE}^L$ is the location offset information for each aggregation level, $N_{eCCE,K}$ is the total number of eCCEs available, and M(L) is the candidate number for each Aggregation Level;
  sending the control signaling to the user equipment, wherein the control signaling includes the at least one ePDCCH set and corresponding configuration information thereof.

6. The method according to claim 5, wherein the determining comprises:
  determining at least one ePDCCH set and corresponding configuration information thereof, and at least one aggregation level and corresponding candidate indication information thereof, configured for the user equipment, wherein the candidate indication information is used to determine the number of candidate ePDCCHs for each aggregation level;
  wherein the generating comprises:
  generating a control signaling based on the at least one ePDCCH set and corresponding configuration information thereof, and the at least one aggregation level and corresponding candidate indication information thereof;
  wherein the sending comprises:
  sending the control signaling to the user equipment, wherein the control signaling comprises the at least one ePDCCH set and corresponding configuration information thereof, and at least one aggregation level and corresponding candidate indication information thereof.

7. The method according to claim 5, wherein the determining comprises:
  determining at least one ePDCCH set and corresponding configuration information thereof, and at least one aggregation level and corresponding candidate indication information thereof, as well as device identification information assigned to a user equipment, configured for the user equipment, wherein the candidate indication information is used to determine the number of candidate ePDCCHs for each aggregation level;
  wherein, the generating comprises:
  generating a control signaling based on the at least one ePDCCH set and corresponding configuration information thereof, and the at least one aggregation level and corresponding candidate indication information thereof, as well as the device identification information;
  wherein the sending comprises:
  sending the control signaling to the user equipment, wherein the control signaling comprises the at least one ePDCCH set and corresponding configuration information thereof, and at least one aggregation level and corresponding candidate indication information thereof, as well as the device identification information.

8. A user equipment for determining ePDCCH-based downlink control information, the user equipment comprising:
  an information receiving apparatus configured to receive a control signaling from an eNB, wherein the control signaling comprises at least one ePDCCH set and corresponding configuration information thereof;
  an index determining apparatus configured to determine candidate resource index information based on the control signaling
based on a predetermined hash function $$\{(Y_k+m) \bmod [N_{eREG,k}^n/L_{eREG}] + D_{m,L,K}\} + i_{eREG,L} \cdot [N_{eREG,k}^n/L_{eREG}]$$

where $Y_k = (A \cdot Y_{k-1}) \bmod D$,
  where $N_{eREG,k}^n$ is the total configured eREG—enhanced-Resource Element Group—number of the specific UE,
  $L_{eREG}$ is the eREG number for each aggregation level L,
  $D_{m,L,K} = m \cdot \{[N_{eCCE,k}^n/L_{eREG}]/M(L)\}$,
  $i_{eREG,L} = 0, 1, \ldots, L_{eREG}-1$ is the corresponding value for each aggregation level L depending on the eCCE—enhanced-Control Channel Element—definition,
  M(L) is the candidate number for each aggregation level L,
  $D_{m,L,K}$ is the offset value to allocate all candidates evenly into all available eREGs, and
  an eCCE—enhanced-control Channel Element—location offset information $S_{eCCE}^L = [N_{eCCE,K}/M(L)]$
  where $S_{eCCE}^L$ is the location offset information for each aggregation level, $N_{eCCE,K}$ is the total number of eCCEs available, and M(L) is the candidate number for each Aggregation Level;

a blind detection executing apparatus configured to perform DCI blind detection operation based on the candidate resource index information, so as to obtain downlink control information corresponding to the control signaling.

9. The user equipment according to claim 8, wherein the index determining apparatus is configured to:

according to the control signaling, determine candidate resource index information based on a predetermined hash function, wherein the hash function includes parameter information of total number of eCCEs and/or eREGs, available and necessary for monitoring.

10. The user equipment according to claim 8, wherein the information receiving apparatus is configured to:

receive a control signaling from an eNB, wherein the control signaling includes at least one ePDCCH set and corresponding configuration information thereof, as well as at least one aggregation level and corresponding candidate indication information thereof, wherein the candidate indication information is used to determine the number of candidate ePDCCHs for each aggregation level;

wherein, the index determining apparatus is configured to:
according to the control signaling, determine candidate resource index information based on a predetermined hash function, wherein the hash function includes parameter information about total number of eCCEs and/or eREGs, necessary for monitoring and available, wherein the candidate resource index information includes eCCE index information and/or eREG index information corresponding to the at least one aggregation level.

11. The user equipment according to claim 8, wherein the information receiving apparatus is configured to:

receive a control signaling from an eNB, wherein the control signaling comprises at least one ePDCCH set and corresponding configuration information thereof, at least one aggregation level and corresponding candidate indication information thereof, and device identification information, wherein the candidate indication information is used to determine the number of candidate ePDCCHs for each aggregation level;

wherein the index determining apparatus comprises:
an eCCE determining unit configured to determine total number information of eCCEs available, based on the configuration information;
an offset determining unit configured to according to the total number information of eCCEs, determine eCCE location offset information for each aggregation level, based on the number of candidate ePDCCHs for each aggregation level;
an index determining unit configured to determine candidate resource index information based on the eCCE location offset information along with the device identification information, wherein the candidate resource index information includes eCCE location information and/or eREG location information corresponding to the at least one aggregation level.

12. An eNB base station for auxiliary determining ePDCCH-based downlink control information, the base station comprising:

a configuration determining apparatus configured to determine at least one ePDCCH set and corresponding configuration information thereof, configured for a user equipment;

a signaling generating apparatus configured to generate a control signaling based on the at least one ePDCCH set and corresponding configuration information thereof based on a predetermined hash function $$\{(Y_k+m) \bmod [N_{eREG,k}''/L_{eREG}]+D_{m,L,K}\}+i_{eREG,L} \cdot [N_{eREG,k}''/L_{eREG}]$$

where $Y_k=(A \cdot Y_{k-1}) \bmod D$,
where $N_{eREG,k}''$ is the total configured eREG—enhanced-Resource Element Group—number of the specific UE,
$L_{eREG}$ is the eREG number for each aggregation level L,
$D_{m,L,K}=m \cdot \{[N_{eCCE,k}''/L_{eREG}]/M(L)\}$,
$i_{eREG,L}=0, 1, \ldots, L_{eREG}-1$ is the corresponding value for each aggregation level L depending on the eCCE—enhanced-Control Channel Element—definition,
M(L) is the candidate number for each aggregation level L,
$D_{m,L,K}$ is the offset value to allocate all candidates evenly into all available eREGs, and
an eCCE—enhanced-control Channel Element—location offset information $S_{eCCE}^L=[N_{eCCE,K}/M(L)]$
where $S_{eCCE}^L$ is the location offset information for each aggregation level, $N_{eCCE,K}$ is the total number of eCCEs available, and M(L) is the candidate number for each Aggregation Level;

a signaling sending apparatus configured to send the control signaling to the user equipment, wherein the control signaling includes the at least one ePDCCH set and corresponding configuration information thereof.

13. The eNB base station according to claim 12, wherein the configuration determining apparatus is configured to:

determine at least one ePDCCH set and corresponding configuration information thereof, and at least one aggregation level and corresponding candidate indication information thereof, configured for the user equipment, wherein the candidate indication information is used to determine the number of candidate ePDCCHs for each aggregation level;

wherein the signaling generating apparatus is configured to:
generate a control signaling based on the at least one ePDCCH set and corresponding configuration information thereof, and the at least one aggregation level and corresponding candidate indication information thereof;

wherein the signaling sending apparatus is configured to:
send the control signaling to the user equipment, wherein the control signaling comprises the at least one ePDCCH set and corresponding configuration information thereof, and at least one aggregation level and corresponding candidate indication information thereof.

14. The eNB base station according to claim 12, wherein the configuration determining apparatus is configured to:

determine at least one ePDCCH set and corresponding configuration information thereof, and at least one aggregation level and corresponding candidate indication information thereof, as well as device identification information assigned to a user equipment, configured for the user equipment, wherein the candidate indication information is used to determine the number of candidate ePDCCHs for each aggregation level;

wherein, the signaling generating apparatus is configured to:
generate a control signaling based on the at least one ePDCCH set and corresponding configuration information thereof, and the at least one aggregation level and corresponding candidate indication information thereof, as well as the device identification information;
wherein the signaling sending apparatus is configured to:
send the control signaling to the user equipment, wherein the control signaling comprises the at least one ePDCCH set and corresponding configuration information thereof, and at least one aggregation level and corresponding candidate indication information thereof, as well as the device identification information.

15. A communication system, wherein the communication system comprises:
a user equipment for determining ePDCCH-based downlink control information, the user equipment comprising:
an information receiving apparatus configured to receive a control signaling from an eNB, wherein the control signaling comprises at least one ePDCCH set and corresponding configuration information thereof,
an index determining apparatus configured to determine candidate resource index information based on the control signaling
based on a predetermined hash function $\{(Y_k+m) \bmod [N_{eREG,k}^n/L_{eREG}] + D_{m,L,K}\} + i_{eREG,L} \cdot [N_{eREG,k}^n/L_{eREG}]$ where $Y_k=(A \cdot Y_{k-1}) \bmod D$,
where $N_{eREG,k}^n$ is the total configured eREG—enhanced-Resource Element Group—number of the specific UE,
$L_{eREG}$ is the eREG number for each aggregation level L,
$D_{m,L,K}=m \cdot \{[N_{eCCE,k}^n/L_{eREG}]/M(L)\}$,
$i_{eREG,L}=0, 1, \ldots, L_{eREG}-1$ is the corresponding value for each aggregation level L depending on the eCCE—enhanced-Control Channel Element—definition,
M(L) is the candidate number for each aggregation level L,
$D_{m,L,K}$ is the offset value to allocate all candidates evenly into all available eREGs, and
an eCCE—enhanced-control Channel Element—location offset information $S_{eCCE}^L=[N_{eCCE,K}/M(L)]$
where $S_{eCCE}^L$ is the location offset information for each aggregation level, $N_{eCCE,K}$ is the total number of eCCEs available, and M(L) is the candidate number for each Aggregation Level;
a blind detection executing apparatus configured to perform DCI blind detection operation based on the candidate resource index information, so as to obtain downlink control information corresponding to the control signaling; and
an eNB base station comprising:
a configuration determining apparatus configured to determine at least one ePDCCH set and corresponding configuration information thereof, configured for a user equipment,
a signaling generating apparatus configured to generate a control signaling based on the at least one ePDCCH set and corresponding configuration information thereof,
based on a predetermined hash function $\{(Y_k+m) \bmod [N_{eREG,k}^n/L_{eREG}] + D_{m,L,K}\} + i_{eREG,L} \cdot [N_{eREG,k}^n/L_{eREG}]$ where $Y_k=(A \cdot Y_{k-1}) \bmod D$,
where $N_{eREG,k}^n$ is the total configured eREG—enhanced-Resource Element Group—number of the specific UE,
$L_{eREG}$ is the eREG number for each aggregation level L,
$D_{m,L,K}=m \cdot \{[N_{eCCE,k}^n/L_{eREG}]/M(L)\}$,
$i_{eREG,L}=0, 1, \ldots, L_{eREG}-1$ is the corresponding value for each aggregation level L depending on the eCCE—enhanced-Control Channel Element—definition,
M(L) is the candidate number for each aggregation level L,
$D_{m,L,K}$ is the offset value to allocate all candidates evenly into all available eREGs, and
an eCCE—enhanced-control Channel Element—location offset information $S_{eCCE}^L=[N_{eCCE,K}/M(L)]$
where $S_{eCCE}^L$ is the location offset information for each aggregation level, $N_{eCCE,K}$ is the total number of eCCEs available, and M(L) is the candidate number for each Aggregation Level;
a signaling sending apparatus configured to send the control signaling to the user equipment, wherein the control signaling includes the at least one ePDCCH set and corresponding configuration information thereof.

* * * * *